(12) United States Patent
Killion

(10) Patent No.: US 7,232,304 B2
(45) Date of Patent: Jun. 19, 2007

(54) HOBBYIST-USEABLE APPARATUS AND METHOD FOR FABRICATING DECORATIVELY-SHAPED WRITING INSTRUMENTS

(76) Inventor: Thomas Killion, 5534 Woodacre Ct., Indianapolis, IN (US) 46234

(*) Notice: Subject to any disclaimer, the term of this patent is extended or adjusted under 35 U.S.C. 154(b) by 360 days.

(21) Appl. No.: 10/796,260

(22) Filed: Mar. 9, 2004

(65) Prior Publication Data

US 2005/0012242 A1 Jan. 20, 2005

Related U.S. Application Data

(60) Provisional application No. 60/453,379, filed on Mar. 10, 2003.

(51) Int. Cl.
*B28B 3/00* (2006.01)

(52) U.S. Cl. ........................ 425/318; 425/12; 425/193; 425/182; 425/384; 425/392; 425/394; 401/52

(58) Field of Classification Search ............... 425/193, 425/318, 182, 392, 394, DIG. 57, 384; 401/52, 401/195
See application file for complete search history.

(56) References Cited

U.S. PATENT DOCUMENTS

| | | | |
|---|---|---|---|
| 2,696,858 A * | 12/1954 | Johnston | 144/256.4 |
| 4,028,540 A | 6/1977 | Key et al. | |
| 4,167,347 A | 9/1979 | Hoyle | |
| 4,526,547 A | 7/1985 | Rusk | |
| 4,832,604 A | 5/1989 | Rusk | |

(Continued)

FOREIGN PATENT DOCUMENTS

GB 1118069 A 6/1968

(Continued)

OTHER PUBLICATIONS

Supplemented Excerpt from Killion, U.S. Appl. No. 10/796,260, Oct. 26, 2004.

(Continued)

*Primary Examiner*—Yogendra N. Gupta
*Assistant Examiner*—Maria Veronica Ewald
(74) *Attorney, Agent, or Firm*—E. Victor Indiano; Indiano Vaughan LLP

(57) ABSTRACT

In accordance with the present invention a hobbyist-useable apparatus and method for fabricating decoratively shaped writing instruments is disclosed. The apparatus for fabricating decoratively shaped writing instruments having a casing includes a heater unit and a shaper unit. The heater unit includes a heat source, and a heating compartment having an opening for inserting and removing the writing instrument casing. The heat source provides heat to the heating compartment. The shaper unit includes a platform having an elongated slot, an exterior mold assembly attachable to the platform and moveable in the elongated slot; an exterior shaping surface coupled to the exterior mold assembly; and an interior mold insert having an interior shaping surface. The interior mold insert is attachable to the platform such that the movement of the exterior mold assembly in the elongated slot moves the exterior shaping surface towards and away from the interior shaping surface. The writing instrument casing is heated in the heating compartment, then the heated casing is placed on the platform and is compressed between the interior shaping surface and the exterior shaping surface by movement of the exterior mold assembly in the elongated slot.

22 Claims, 12 Drawing Sheets

U.S. PATENT DOCUMENTS

| | | |
|---|---|---|
| 5,673,996 A | 10/1997 | Ducker |
| 6,346,211 B1 * | 2/2002 | Rafferty et al. ............. 264/573 |
| 6,773,191 B2 | 8/2004 | Killion |

FOREIGN PATENT DOCUMENTS

| | | |
|---|---|---|
| GB | 1581835 B1 | 12/1980 |
| GB | 2212449 A | 7/1989 |

OTHER PUBLICATIONS

Excerpt from www.bentcil.com showing decorative shaped writing instruments sold by The Bentcil Co., no date.

* cited by examiner

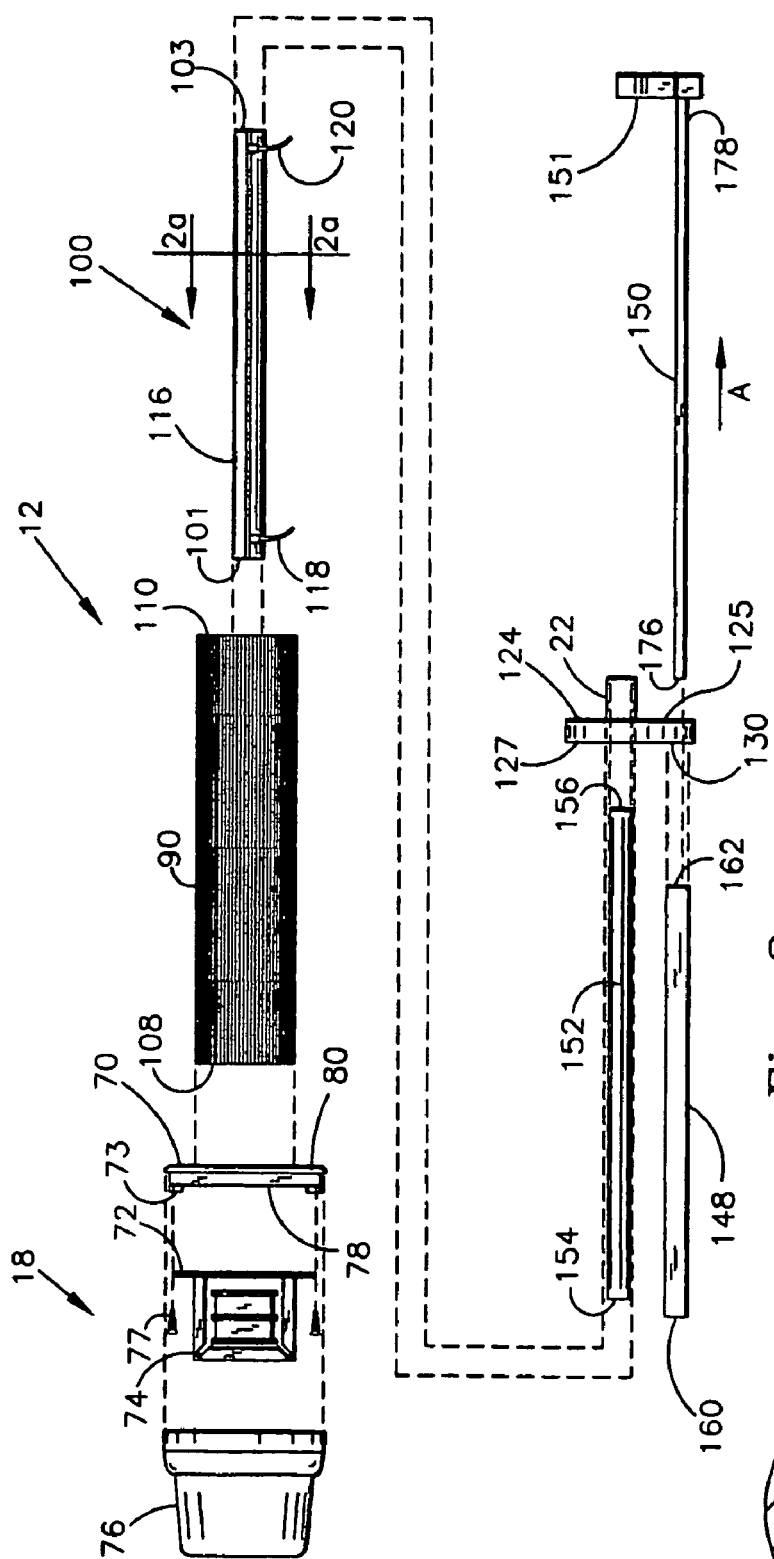
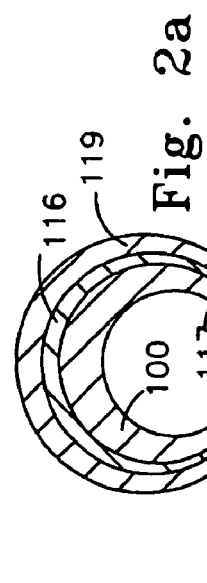
Fig. 2
Fig. 2a

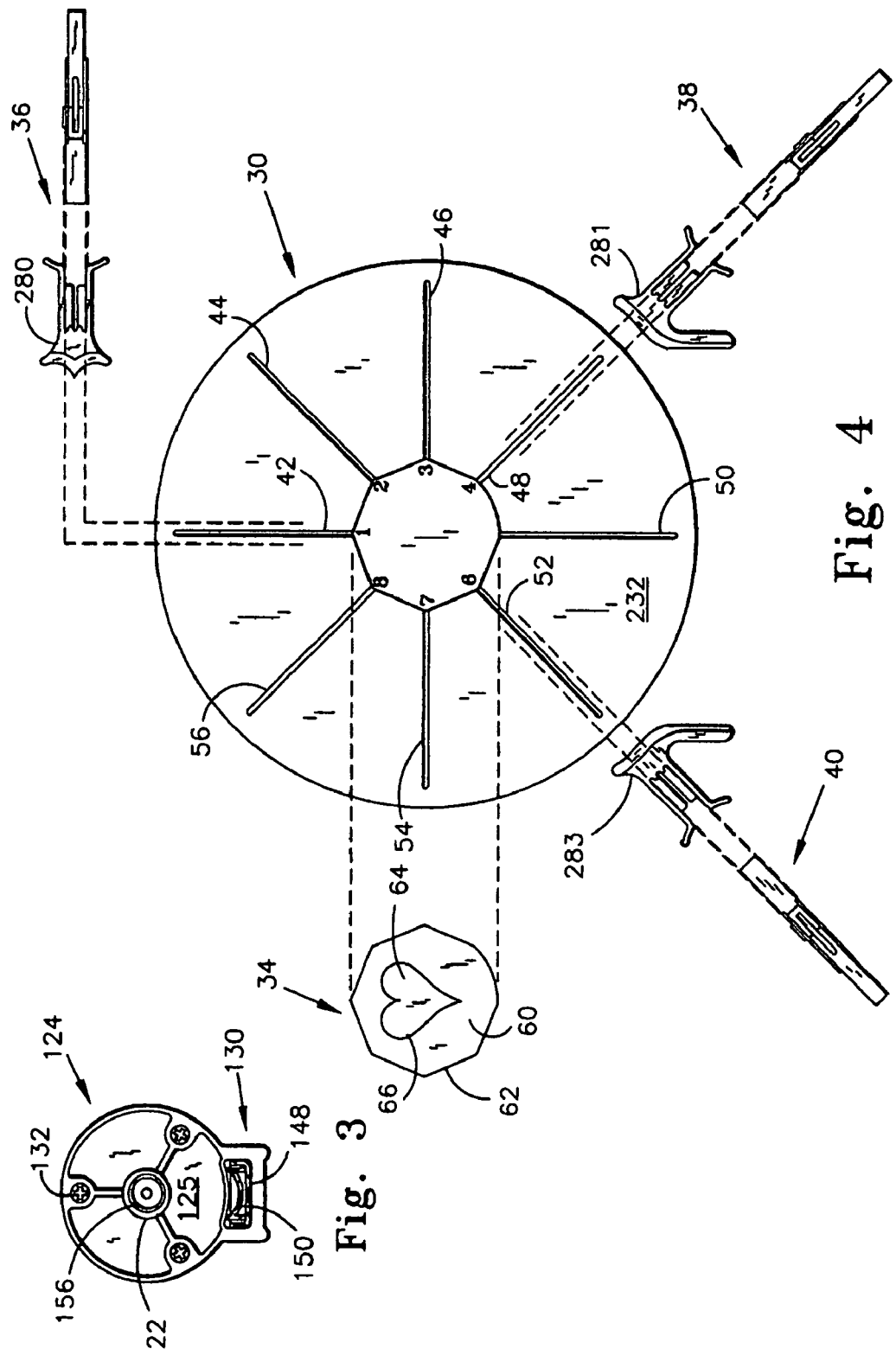

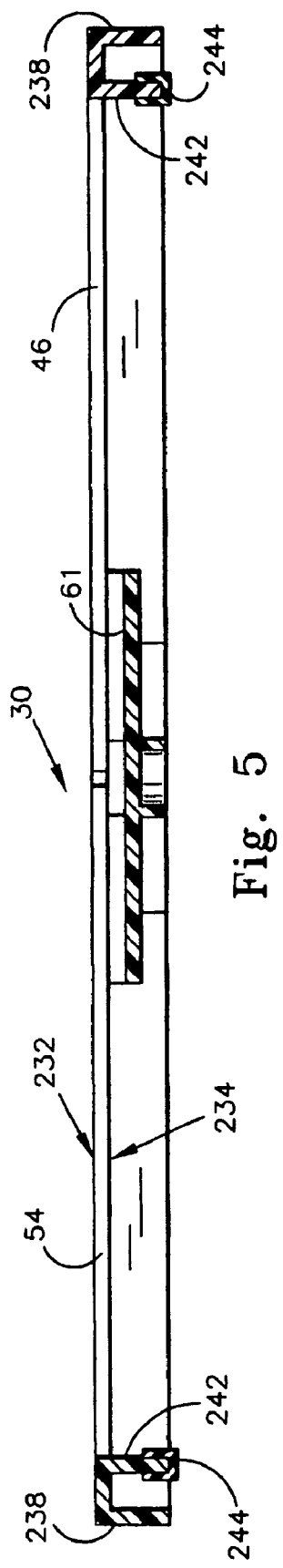
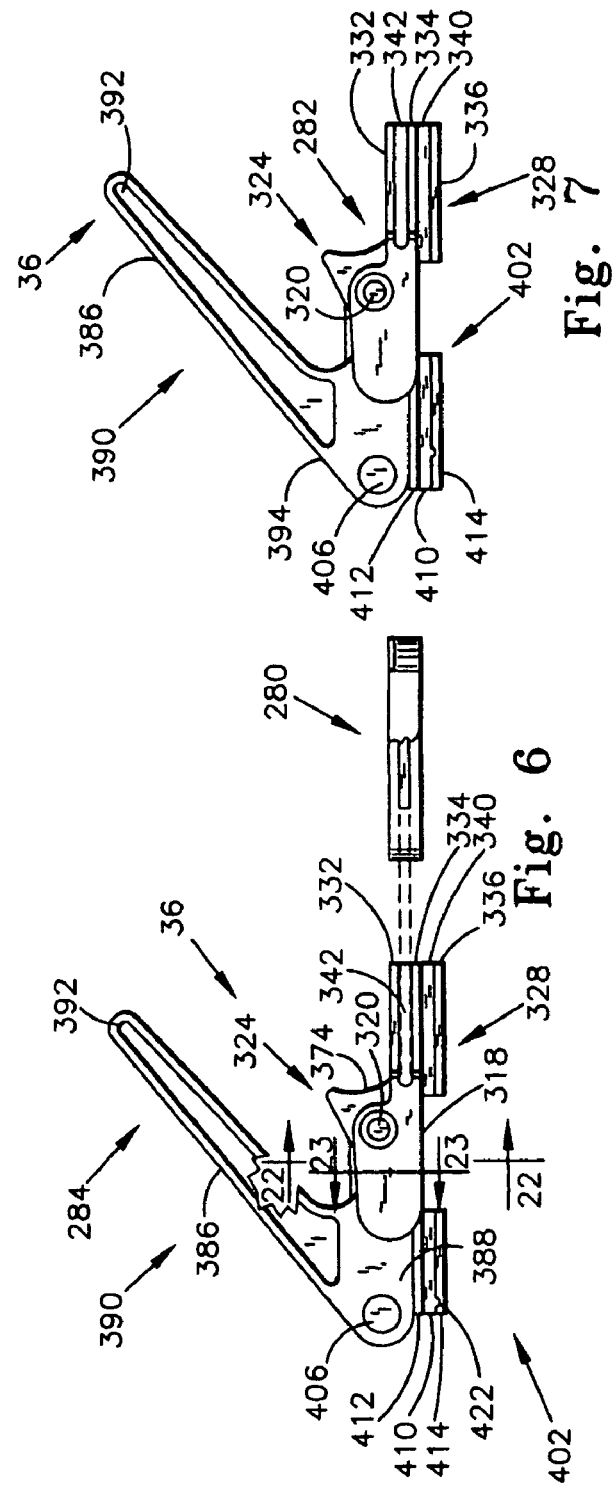

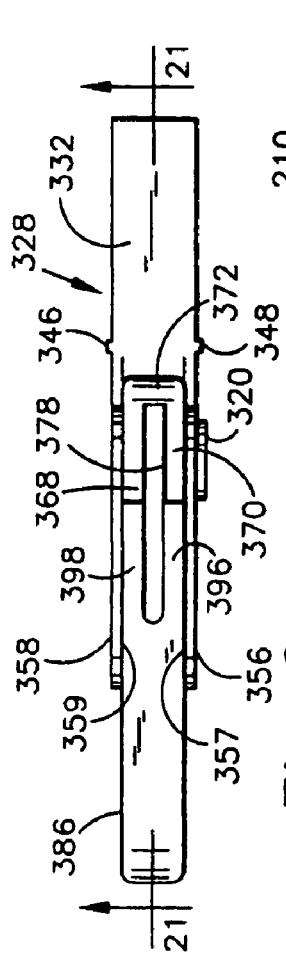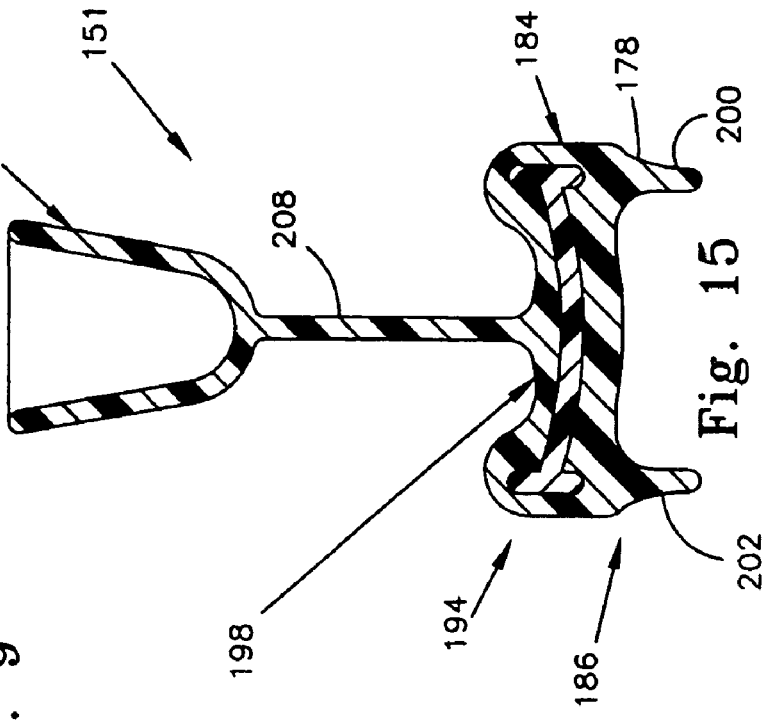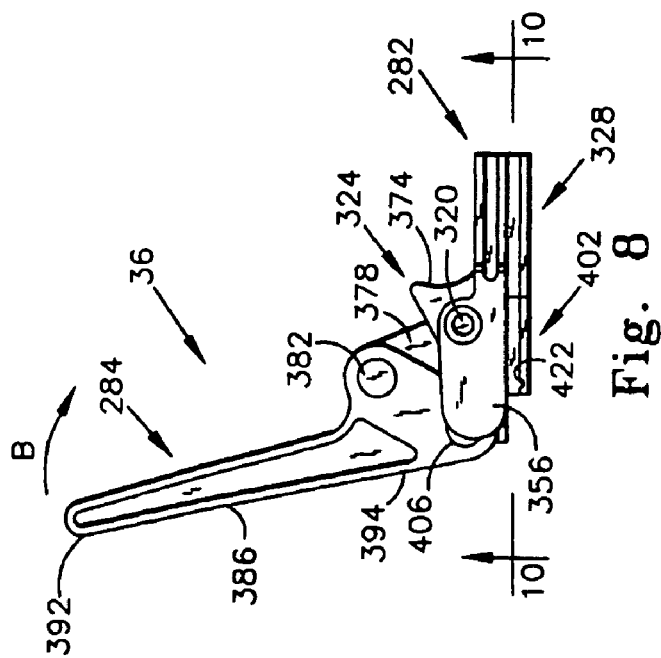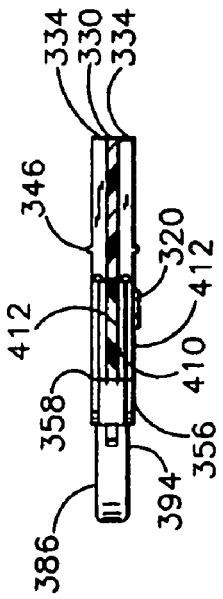

HOBBYIST-USEABLE APPARATUS AND METHOD FOR FABRICATING DECORATIVELY-SHAPED WRITING INSTRUMENTS

STATEMENT OF PRIORITY

This application claims the benefit of U.S. Provisional Patent Application No. 60/453,379, filed Mar. 10, 2003, entitled "HOBBYIST USEABLE DEVICE FOR FABRICATING DECORATIVELY SHAPED WRITING INSTRUMENTS" which is incorporated herein by reference.

I. FIELD OF THE INVENTION

The present invention relates to a recreational device useable by hobbyists and children, and more particularly, to a device useable by a hobbyist or elementary school-aged (or older) children to fabricate writing instruments having decorative shapes.

II. BACKGROUND OF THE INVENTION

Writing instruments, such as pens, pencils and the like have an elongated tubular shape. The tubular shape can have anyone of a variety of cross-sectional configurations, including circular, hexagonal, triangular or the like. Anyone who has ever visited a stationery store, walked down the school supply aisle of a mass merchandiser, or spent time in an office supply store recognizes that writing instruments such as pens and pencils, in a wide variety of shapes and sizes exist, and also recognizes that most writing instruments are primarily linear in their configuration.

Back in the mid-1980s, the Applicant happened upon an idea to make writing instruments, such as pencils into decorative shapes. These decorative shapes were achieved by starting with a standard, linear pen or pencil that was made from a thermo-formable material. In this regard, standard pencils were not useable, since most pencils have a the wood casing that is not bendable or shapeable under the influence of heat. The Applicant heated one end of the generally linear writing instrument to a point wherein the material from which the body of the instrument was made became "soft" enough to be bendable, and thereby formable into a decorative shape.

The Applicant found that an interior mold-type device could be used as a template around which to bend the heated and softened writing instrument to form the writing instrument into a desired shape that was consistent from pencil to pencil. Among the first shapes that the Applicant made were pencils having an eraser end portion that was formed into a shape that resembled a heart. The finished pencil had a heart-shaped top portion, and a generally linearly bottom portion, that was capable of being sharpened and used as a conventional writing instrument.

Although the Applicant first employed his design with pencils, he later found that stick-type pens could also be employed to create pen-type writing instruments having decorative shapes. In this regard, the Applicant found, through experimentation, that the best results were achieved by employing elongated stick-type pens that had a length longer than a standard stick pen, so that the final product would comprise a pen having a normal length linear portion to which was added the decorative head portion.

In the ensuing years, the Applicant has employed a wide variety of molds to create a wide variety of shapes, including shapes as diverse as hockey sticks, alligators, T-shirts, numerals, sharks, pets and inanimate objects. A sampling of the variety of shapes that the Applicant has employed in his decorative writing instruments can be viewed at www.bentcil.com.

One interesting use to which the Applicant's writing instruments have been placed is in connection with fund-raising efforts. In this regard, the Applicant's customers have included groups that have requested the Applicant to construct a decorative pen having a shape that bears some relation to the activity, mascot or other characteristic of the group. For example, a hockey team might order a pen having a top portion that resembled a blade of a hockey stick. Similarly, an association of attorneys might order a batch of pens having a shark-shaped top portion. The group would then order a quantity of pens that were sold by the members of the group to help raise funds for the group, and to promote the groups' activities.

It occurred to the Applicant that another way to exploit the value of the decorative pencils, both as a fund raising tool and as an educational experience, is to create a device that could be used by the hobbyist or child-type consumer to produce his or her own decorative pencils which could then be resold for fund-raising purposes, or enjoyed by the maker. For children, this would have the benefit of providing the children with some manufacturing experience.

Producing such a device created a substantial challenge, as a consumer-useable device faces engineering constraints that are not found in devices that are used in industrial settings. In particular, the industrial devices used by the Applicant in his factory would not be suitable for use by consumers, both because the tooling used in industrial devices is much too expensive to be priceable at an attractive price point for consumers, and also because the industrial devices are designed for use by trained technicians, and, hence, might not be suitable for use by untrained consumers, and especially children.

Therefore, one object of the present invention is to create a consumer-useable device, of the type that might be used by a casual hobbyist, or elementary-school-aged child, to enable the child to convert generally linear writing instrument blanks into finished writing instruments having a decorative shaped portion.

III. SUMMARY OF THE INVENTION

In accordance with the present invention, a consumer-useable device and method is disclosed for enabling the user to make decoratively shaped writing instruments. The device includes a heater unit and a shaper unit. The heater unit includes a heating compartment having an opening for inserting and removing a writing instrument casing, and a heat source that provides heat to the heating compartment. The shaper unit includes a platform having an elongated slot; an exterior mold assembly that is attachable to the platform and moveable in the elongated slot; an exterior shaping surface coupled to the exterior mold assembly; an interior mold insert that has an interior shaping surface. The interior mold insert is attachable to the platform such that the movement of the exterior mold assembly in the elongated slot moves the exterior shaping surface towards and away from the interior shaping surface. The casing of the writing utensil is heated in the heating compartment, then the heated casing is placed on the platform and is compressed between the interior shaping surface and the exterior shaping surface by movement of the exterior mold assembly in the elongated slot of the platform.

The interior mold member is preferably removably attachable to the platform to enable the changing of the interior pattern around which the writing instrument can be shaped. The platform preferably includes a series of radially extending slots, and the exterior mold assemblies are preferably removably attachable to any of the radially extending slots to enable the changing of the exterior pattern around which the writing instrument can be shaped.

In the preferred embodiment, the exterior mold assemblies include a slot-engaging portion, an exterior mold insert, and a lever member. The slot-engaging member enables the exterior mold insert to be moved radially on the platform, so that it can move into and out of engagement with the writing instrument. The mold insert is removably attachable to the lever member, to permit different mold inserts to be attached the lever members, to permit the user to change the shape of the writing instrument so formed.

The lever member is capable of radially moving the exterior mold inserts attached thereto, between a disengaged position wherein the exterior mold insert does not engage the writing instrument casing, and an engaged position wherein the mold insert engages the writing instrument casing to help form the desired shape that is to be formed on the writing instrument.

One feature of the present invention is that each of the interior and exterior molds are selectively attachable to the platform member. This feature has the advantage of enabling the user to change mold inserts, to thereby impart different shapes to the writing instrument, thus rendering the device capable of making a very wide variety of parts.

Another feature of the present invention is that it includes a radially extending slotting system. As will be appreciated, different exterior molds likely need to be placed at different angular positions relative to the interior mold, in order to engage the writing instrument properly, to form the desired shape. This slotting system helps to make the device adaptable for use with a wide variety of molds, to form a wide variety of shapes, as the eight radial slots provide a wide variety of different angular positions from which the exterior mold inserts can address the writing instrument.

Another feature of the present invention is that a lever member is employed that is designed to avoid pinch points. This feature helps to make the invention more safe for use, as it is less likely to pinch the fingers of the user.

A further feature of the present invention is that anti-lifting features are included within the lever device that enable the exterior mold member device to move in a generally linear direction, and to not lift as it engages the writing instrument. This feature has the advantage of enabling the user to make parts having higher quality and more consistency, since the anti-lifting features permit the exterior mold member to engage the writing instrument in a more consistent, and better positioned manner.

It is also a feature of the present invention that the device includes a series of indicia for numbering the radially extending slots. This feature has the advantage of facilitating the assembly and set-up of the device by the user. It will be appreciated that different shaped writing instruments require not only the use of different interior and exterior mold members, but also require the exterior mold members to be placed in different angular positions. Through the use of the numbered indicia, the user can more surely place the exterior mold assemblies in the proper slot, to enable them to form the device. Preferably, the interior mold includes indicia that inform the user of the appropriate slot in which to place each of the exterior mold assemblies.

Also disclosed is a method of making a decorative writing utensil that includes several steps. One step is selecting a slot on a platform in which to attach an exterior mold assembly. The exterior mold assembly includes an exterior shaping surface, and a lever arm moveable between a raised position in which the exterior shaping surface is retracted and a lowered position in which the exterior shaping surface is extended. Other steps include inserting the exterior mold assembly in the selected slot; putting the lever arm of the exterior mold assembly in the raised position; and inserting an interior mold assembly that has an interior shaping surface in the platform. Additional steps include inserting a writing instrument casing in a heater unit; heating the writing instrument casing in the heating unit; removing the heated writing instrument casing from the heating unit; and placing the heated writing instrument casing on the platform near the interior shaping surface. The steps also include lowering the lever arm of the exterior mold assembly to move the exterior shaping surface toward the interior shaping surface to compress the writing instrument casing between the interior and exterior shaping surfaces; letting the writing instrument casing cool; and raising the lever arm of the exterior mold assembly to move the exterior shaping surfaces away from the interior shaping surfaces to release the writing instrument casing.

These and other features of the present invention will become apparent to those skilled in the art upon a review of the drawings set forth below, and the following detailed description, that represents the best mode of the present invention perceived by the Applicant presently.

IV. BRIEF DESCRIPTION OF THE DRAWINGS

FIG. 2 is an exploded view of the heater unit of the present invention;

FIG. 2a is an enlarged sectional view of the heater tube taken along lines 2a-2a of FIG. 2;

FIG. 3 is a sectional view taken along lines 3-3 of FIG. 1;

FIG. 4 is a top exploded view of the shaper member of the present invention;

FIG. 5 is a sectional view taken along lines 5-5 of FIG. 1;

FIG. 6 is an exploded side view of the lever and exterior mold member of the present invention, showing the lever in its extended (engaged) position;

FIG. 7 is a side, assembled view of the lever member of the present invention;

FIG. 8 is a side view of the lever member of the present invention in its retracted (disengaged) position;

FIG. 9 is a top view of the lever member of the present invention;

FIG. 10 is a sectional view taken along lines 10-10 of FIG. 8;

FIG. 15 is a sectional view taken along lines 15-15 of FIG. 14.

V. DETAILED DESCRIPTION

Figure 1:
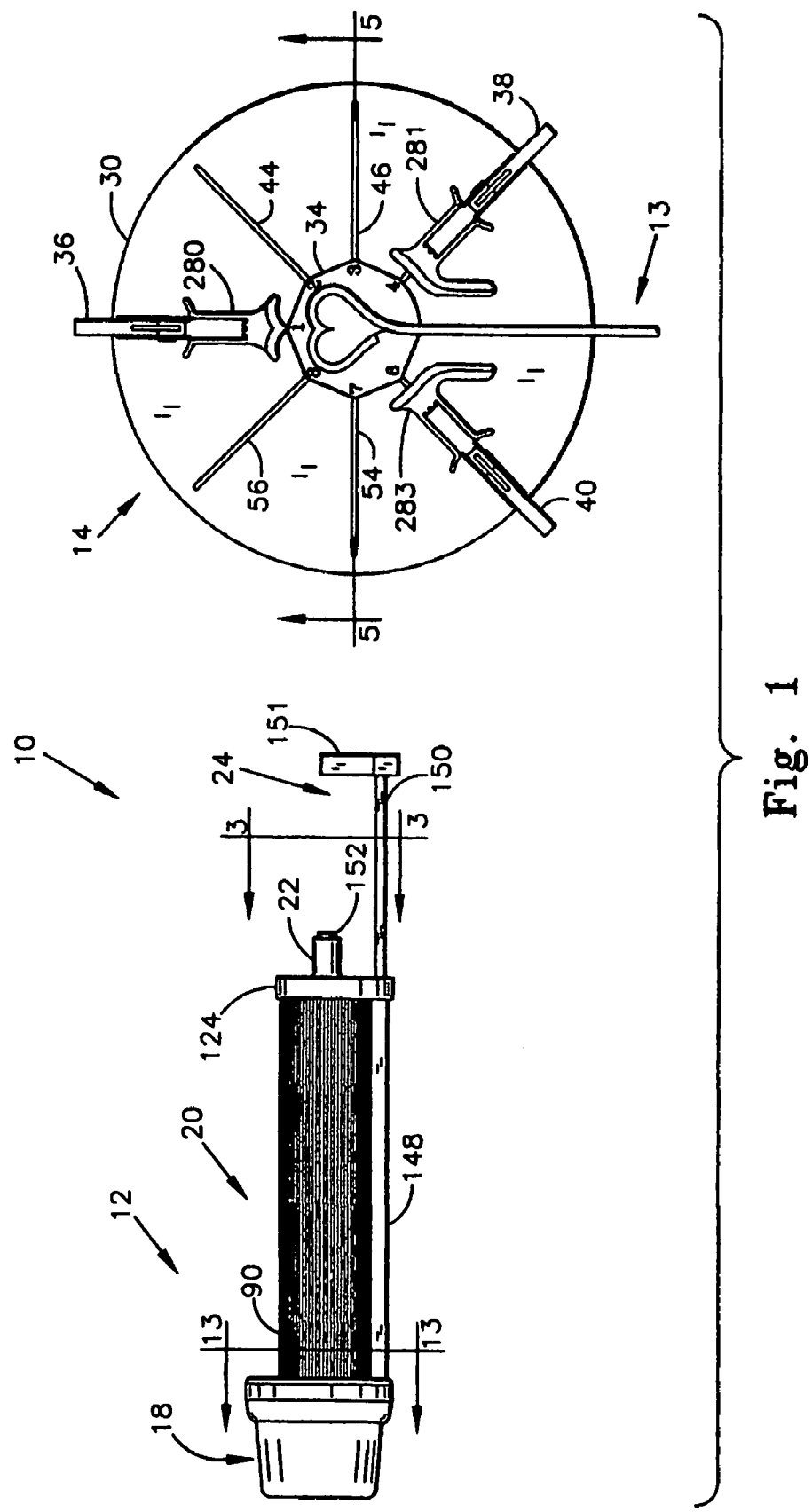
FIG. 1 is an elevational view of the heater and shaper components of the present invention.
Figure 12:
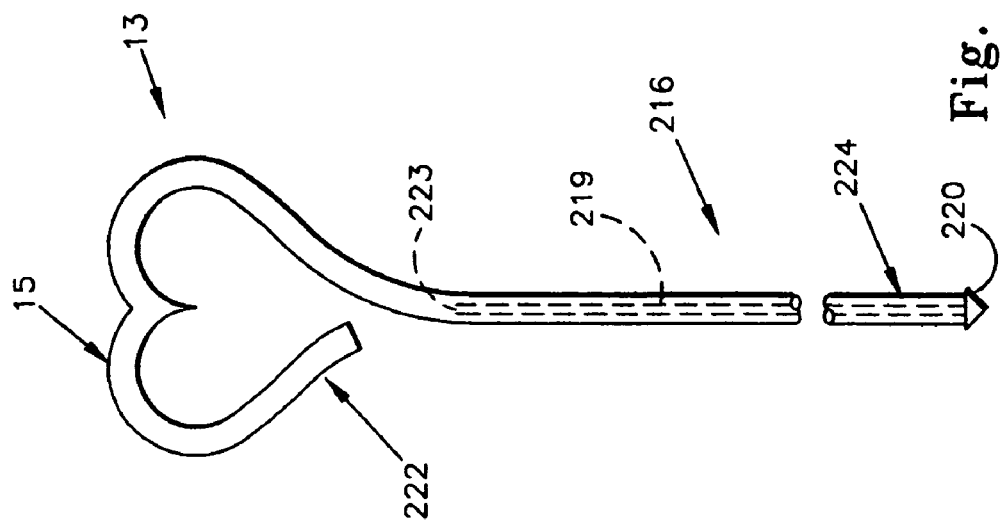
FIG. 12 is a side view of a "finished part" formed writing instrument of the present invention.
Figure 11:
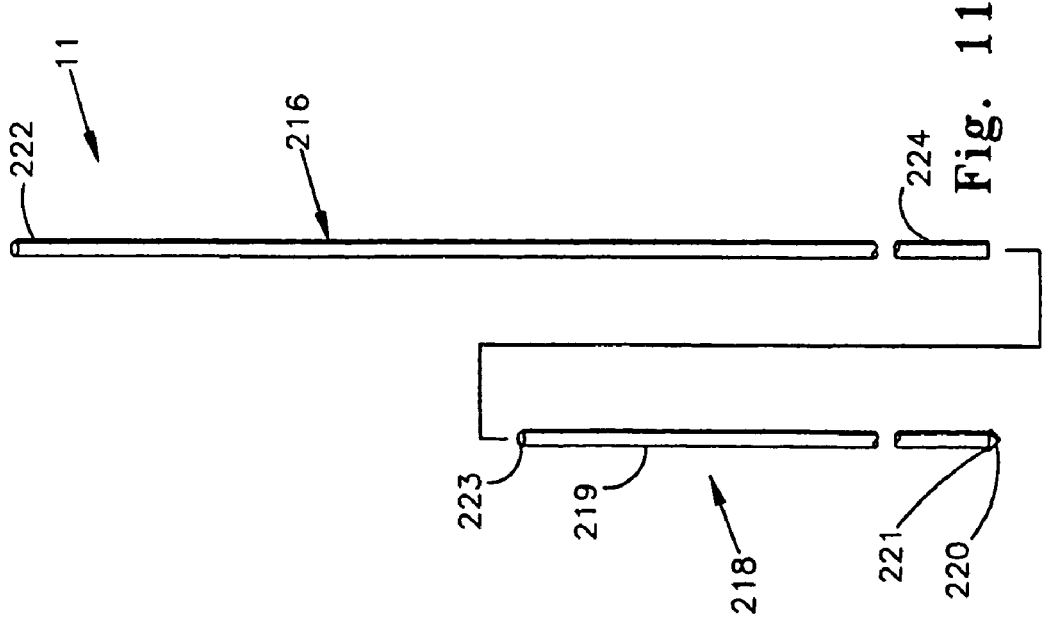
FIG. 11 is an exploded side view of an unformed "blank" writing instrument useable by the present invention.

A writing instrument forming device 10 of the present invention is shown in the figures. Turning first to FIGS. 1, 11 and 12, the writing instrument forming device 10 is designed to enable a user to transform an initially elongated, generally linear writing instrument blank 11 (FIG. 11) into a finished decorative writing instrument 13 (FIG. 12) having a decoratively shaped head portion 15. Returning to FIG. 1, the forming device 10 includes two major components, a shaper unit 14, and a heater unit 12. The heater unit 12 includes a power supply portion 18, and a writing instrument receiver/heating element portion 20. A receiving tube 22 is provided for receiving a writing instrument, so that the writing instrument can be inserted into the interior of the receiver/heating element portion 20. An adjustable-length gauge 24 is provided for enabling the user to insert the writing instrument 11 an appropriate and proper distance into the receiving tube 22.

The shaper 14 includes a platform 30, an interchangeable interior mold insert 34, a first exterior mold assembly 36, a second exterior mold assembly 38, and a third exterior mold assembly 40. The platform 30, best shown in FIG. 4, has a central mold receiving well 61 sized and shaped for receiving the interchangeable interior mold insert 34. The platform 30 also has eight radially extending mold assembly receiving slots: a first radially extending mold assembly receiving slot 42, along with a second 44, third 46, fourth 48, fifth 50, sixth 52, seventh 54 and eighth 56 radially extending, mold assembly receiving slot. The eight radially extending mold assembly receiving slots 42-56 are generally spaced evenly around the platform 30, separated by approximately 45 degrees. Each of the mold assemblies 36, 38, 40 are sized and shaped to be engaged in any one of the eight radially extending slots 42-56. The exterior mold assemblies 36, 38, 40 are moveable radially, inwardly and outwardly in the slots 42-56.

As stated above, the Applicant employs eight evenly spaced mold assembly receiving slots 42-56. The Applicant chose this number because the Applicant believes that eight evenly spaced slots is a sufficient number of slots to permit the user to manufacture almost any desired decorative shape. The Applicant believes that the addition of more slots would not result in any significant increase in the number of shapes that could be formed, although a decrease in the number of slots could significantly limit the number of shapes that could be formed.

The interior mold insert 34 includes a base 60 and a raised interior mold member 64. The base 60 has a generally planar bottom, and a planar top, and a radially outwardly facing perimetral surface 62. The base 60 is sized, shaped and configured to be received within the mold receiving well 61 that is formed as part of the platform 30. The perimetral surface 62 is not a continuous regular shape, but rather comprises a segmented irregular shape. The irregularity of the segments makes the perimetral surface 62 non-symmetrical. This non-symmetrical configuration of the perimetral surface 62 is employed as a placement device, since the non-symmetrical surface 62 only permits the base 60 of the interior mold insert 34 to be received within the well 61 of the platform 30 in one position, thereby ensuring that the interior mold insert 34 is properly oriented on the platform 30. The raised interior mold member 64 has a radially outwardly facing shaping surface 66 that extends upwardly from the top surface of the base member 60. The shaping surface 66 is the actual surface around which the writing instrument is shaped. As shown in FIG. 4, the interior mold member 64 is generally heart-shaped. As such, this heart-shaped interior mold will yield a heart-shaped writing instrument 13, such as is shown FIG. 12. It will be appreciated nonetheless, that interior mold inserts having mold members of other shapes could be used to form writing instruments having different final shapes. For example, an alligator-shaped mold member 64 would result in an alligator-shaped writing instrument. As will be discussed in more detail below, the radially outwardly facing surface 66 of the interior mold member 64 is the surface around which the writing instrument to be formed is wrapped, to give the writing instrument its decorative shape.

Figure 13:
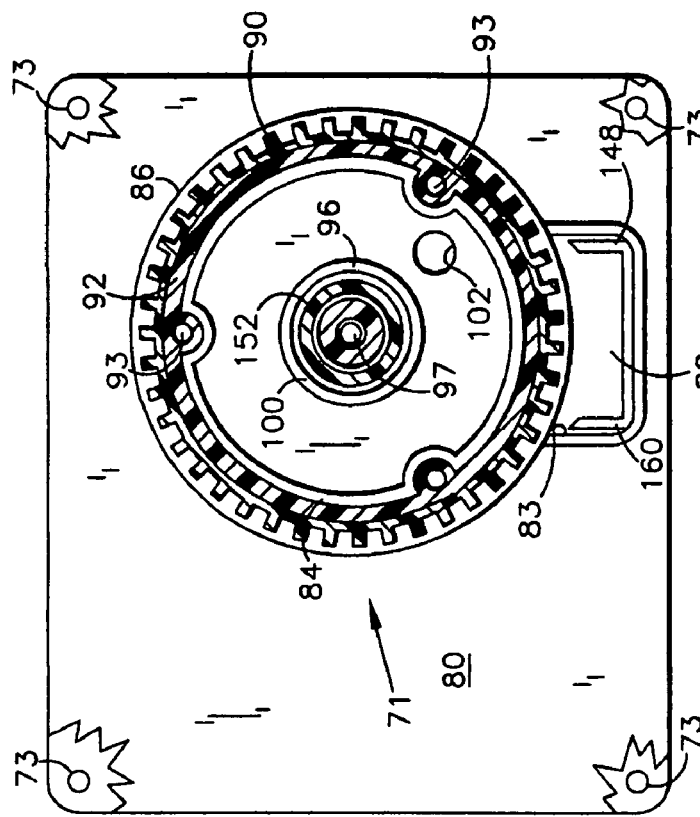
FIG. 13 is a sectional view of the frame of the heater unit taken along line 13-13 of FIG. 1.

Turning now to FIGS. 2, 3, and 13, the heater and gauge assembly 12 will be explained in more detail. The power supply portion 18 of the heater assembly 12 includes a cover 76 and a frame 70 having a proximal surface 78 and a distal surface 80. A transformer 74 and electronic controls (not shown) are attached to the proximal surface 78 of the frame 70. The transformer 74 supplies electrical power to a resistance heating element 116, and is employed to transform 120 volt household current into the 11 volt current supplied to the resistance wire 116. The transformer 74 includes a pair of mounting flanges 72 that extend radially outward which each include an aperture through which screws 77 can extend for coupling the mounting flange 72. The proximal surface 78 of the frame 70 includes a pair of blind hole screw receivers 73 that extend axially outward from the proximal surface 78. The screws 77 attach the transformer 74 to the proximal surface 78 of the frame 70 by extending through the apertures of the mounting flange 72 into the screw receivers 73.

The distal surface 80 of the frame 70 (see FIG. 13) includes a multi-leveled formed surface for providing a variety of functions. The distal surface 80 includes a gauge cover receiving recess 82 that is provided for receiving a gauge cover 148.

The distal surface 80 also includes an insulator cover retaining portion 71 that includes a smaller diameter circumferential inner insulator cover capturing wall 84 that is cooperatively positioned with, and disposed interiorly of and concentrically with, a larger diameter circumferential outer insulator cover capturing wall 86. The smaller and larger diameter insulator cover capturing walls 84, 86 define a generally circular cavity that is sized and positioned for receiving the proximal end of an insulator cover 90.

The insulator cover 90 includes a radially inwardly extending open-topped, can-like mounting bracket 92 that contains three screw-receiving apertures 93. The screw-receiving apertures 93 are alignable with apertures (not shown) in the frame 70, for receiving screws that pass from the proximal surface 78 to the distal surface 80 of the frame 70, for securing the mounting bracket 92, and hence the cylindrical insulating cover 90, to the frame 70. As an alternative to the use of the mounting bracket 92, the insulator cover 90 can be extruded so that it has a constant cross sectional shape similar to the cross sectional shape of the mounting bracket 92. In such case, the screw receiving apertures 93 can be drilled into the cover 90 after the cover 90 is formed through the use of an appropriately configured drill fixture.

The distal surface 80 of the frame 70 also includes a heating tube retainer wall 96 that is generally circular in configuration. The heating tube retainer wall 96 is also disposed interiorly of and concentrically with the insulator cover retaining walls 84, 86. The heating tube retainer wall 96 is sized and configured for interiorly receiving an elongated heating tube 100, whose proximal end engages the radially inwardly facing surface of the heating tube retainer wall 96. A conductor aperture 102 is provided through which conductors can pass from the power transformer 74, through the frame 70, and into the generally hollow interior of insulating cover 90 to connect with the heating tube 100.

The frame 70 also includes a central aperture 97 through which a screw can pass for anchoring the heating tube 100 onto the frame 70, if such is desired. Alternately, a friction fit coupling between the heating tube 100 and the heating tube retainer wall 96 can be employed, especially if the heating tube 100 is securely coupled to a distal end cap 124 of the insulator cover 90.

The heating tube 100 includes a proximal end 101 and a distal end 103. As alluded to above, the proximal end 101 is sized and configured to be snugly received by the heating tube retainer wall 96 of the frame 70. The distal end 103 of the heating tube 100 is sized and positioned to be interiorly received within a similarly configured retaining wall of the distal end cap 124 of the insulator cover 90.

As best shown in FIG. 2a, an interior insulating tape 117 and an exterior insulating tape 119 sandwich the resistance wire 116, and this insulating tape and wire sandwich is wound around the exterior surface of the heating tube 100 throughout most of the length of the heating tube 100. The heating tube 100 is first overlain with the interior fiberglass tape 117 which is double-sided, having glue on both of its sides. The heating ribbon 116 is preferably Ni Chrome, conductive, resistance heating ribbon, approximately 0.25 inches in width. The heating ribbon is spirally wrapped around the heating tube 100 to overlay the double sided tape 117 much like the red stripe on a candy cane. The glue on the outer side of the interior insulating tape 117 serves to secure the conductive heating ribbon 116 to the tape 117, and hence to the heating tube 100. An exterior layer of the fiberglass tape 119, which is single-sided, is then placed over the length of the tube 100 to overlay both the double stick interior layer of tape 117 and the conductive heating ribbon 116. The second layer of tape 119 serves primarily as an insulator, and may not be necessary. Preferably, both layers of insulator tape 117, 119 are die-cut to facilitate the placement of the tape 117, 119 on the tube 100.

The heating tube 100 is made of metal, preferably aluminum or steel. The Ni Chrome conductor ribbon 116 conducts electricity, much like the wires within a toaster and becomes heated when current is run through the conductor ribbon 116. The heat from the ribbon 116 is transferred to the tube 100 because of the proximity of the ribbon 116 to the tube 100, and because of the conductive nature of the metal from which the tube 100 is made. A first conductor connector 118 is connected to the ribbon 116 adjacent to the proximal end 101 of the heating tube 100, and a second conductor connector 120 is connected to the ribbon 116 adjacent to the distal end 103 of the heating tube 100. The conductor connectors 118, 120 are coupled to lead wires (not shown) that pass through the conductor aperture 102 of the frame 70 and are connected to the power transformer 74 to form a current path from the transformer 74 through the ribbon cable 116.

A high melting temperature tubular plastic sleeve 152, preferably made from a Teflon material, includes a proximal end 154 and a distal end 156. The sleeve 152 is insertable into the hollow interior of the heating tube 100 to form an interior sleeve thereof. The sleeve 152 has a length generally greater than the length of the heating tube 100 so that the proximal end 154 of the sleeve 152 can be inserted against the distal surface 80 of the frame 70 and the distal end 156 of the sleeve 152 will extend through and slightly axially outward of the writing instrument receiving port 22.

One purpose of the sleeve 152 is to serve as a temperature moderating semi-insulator to prevent the full heat from the metal heating tube 100 from impacting a casing 216 of the inserted writing instrument blank 11. The sleeve 152 is positioned between the inserted writing instrument casing 216 and the metal heating tube 100, to better and more uniformly spread out the heat from the heating tube 100 over the length of the writing instrument casing 216, to help prevent "hot spots" from melting or otherwise marring the surface of the writing instrument casing 216, and to reduce the heat applied to the writing instrument casing 216 to prevent the plastic of the writing instrument casing 216 from melting. Another feature served by the sleeve 152 is that it has a smaller inner diameter than the metal heating tube 100 which makes it more difficult for users to burn themselves by sticking their fingers into the interior passageway of the metal heating tube 100. A further feature served by the sleeve 152 is that the sleeve 152 can be removed from the heating tube 100 to dislodge any writing instrument blank 11, or portions thereof, which may become stuck in the sleeve 152. As such, a writing instrument blank 11 stuck in the heating unit 12 can be dislodged by removing the sleeve 152 and striking it against a hard object, or other method of dislodging the blank 11 from the sleeve 152, and then replacing the sleeve 152 in the heating unit 12, without requiring the user to disassemble the heater unit 12.

The distal end cap 124 secures the distal end 110 of the insulting cover 90 and the distal end 103 of the heating tube 100. The distal end cap 124 includes a proximal surface 127 and a distal surface 125. The distal surface 125, best shown in FIG. 1, includes the central axially extending receiving tube 22 that interiorly receives the distal end 156 of the tubular sleeve 152. Three screws 132 are provided for securing the distal end cap 124 to the mounting flange (not shown) that is disposed at the distal end 110 of the insulting cover 90. The mounting flange (not shown) at the distal end 110 of the insulting cover 90 is generally similar in size, shape and configuration to the mounting bracket 92 at the proximal end of the cover 90, that is shown in FIG. 13.

The proximal surface 127 of the distal end cap 124 is generally similar in configuration to the insulator cover receiving portion 71 of the frame 70, and also includes a series of recesses and axially extending retaining walls for retaining the insulating cover 90 and the heating tube 100 with the interior sleeve 152. In this regard, the proximal surface 127 of the distal end cap 124 is configured generally similarly in cross section to its counterpart insulator cover receiving portion 71 on the distal surface 80 of the frame 70, with one exception being that the frame 70 does not include a central aperture as noted below, but merely a blind recess.

The proximal surface 127 includes a smaller diameter circumferential inner insulator cover capturing wall 484 that is cooperatively positioned with, and disposed interiorly of and concentrically with, a larger diameter circumferential outer insulator cover capturing wall 486. The smaller and larger diameter insulator cover capturing walls 484, 486 define a generally circular cavity that is sized and positioned for receiving the distal end 110 of the insulator cover 90. The proximal surface 127 of the distal end cap 124 also includes a heating tube retainer wall 496 that is generally circular in configuration. The heating tube retainer wall 496 is disposed interiorly of and concentrically with the insulator cover retaining walls 484, 486. The heating tube retainer wall 496 is sized and configured for interiorly receiving the distal end 156 of the heating tube 100, whose distal end 156 engages the proximal surface 127 of the distal end cap 124.

Additionally, as shown in FIG. 3, the distal end cap 124 includes a gauge receiving portion, that includes a gauge receiving aperture 130 for receiving the gauge receiving cover 148 and the adjustable-length gauge 24.

The insulating cover 90 includes a proximal end 108 and a distal end 110. The insulating cover 90 is preferably made from a thermally stable, but relatively non-heat conductive material such as plastic, so that the heat from the metal heating tube 100 will not be conducted well through the cover 90. This is so a user can touch the exterior surface of the cover 90, or use the cover 90 to pick up the heater unit 12, without burning themselves even while the heating tube 100 is fully heated. The insulating cover 90 should have a sufficient length to encase the entire heating tube 100, and should have a sufficient length to receive the deformable portion of a writing instrument of normal length. In this regard, the Applicants have found that an insulating cover 90 having a length of about 12 inches will suffice for most applications.

As shown in FIG. 2, the insulating cover 90 is ribbed. This ribbed structure helps to better dissipate the heat, provide a better gripping surface for the user, and helps to increase structural rigidity of the device. Additionally, the ribbed surface of the insulating cover 90 provides a smaller contact area on the hand of the user gripping it, thus reducing the heat that the cover 90 can conduct to the user's hand.

The writing instrument length gauge assembly 24 is provided for enabling the user to insert the writing instrument casing 216 into the heating tube 100 and the sleeve 152 at a length appropriate for the particular design that the user is going to make. Some designs require a greater length of the writing instrument casing 216 to complete, whereas other designs, either because of their simplicity, or because of their smaller size, require less length of the writing instrument casing 216. As mentioned above in connection with FIG. 4, a decorative head for the writing instrument is manufactured by wrapping the semi-molten writing instrument casing 216 around the perimetral surface 66 of the interior mold 34. As such, the length of the portion of the writing instrument casing 216 necessary to create the decorative head portion 15 will generally be dependent upon the length of the perimetral surface 66 which, naturally will vary depending upon the particular design used.

The length gauge assembly 24 comprises three primary components, including the gauge cover 148, a slideable ruler member 150, and an instrument support member 151 that is fixedly coupled to the slideable ruler member 150.

Turning now to FIGS. 2 and 14-16, the gauge cover 148 comprises an elongated channel having a U-shaped cross-section with a proximal end 160 and a distal end 162. The proximal end 160 is sized and shaped to fit in the gauge cover receiving recess 82 on the distal surface 80 of the frame 70. The distal end 162 is captured by the gauge receiving aperture 130 of the distal end cap 124. The gauge cover 148 includes a generally laterally extending back portion 166 having an front ruler-receiving surface 167. A first upstanding wall 168 is disposed on one side of the front ruler-receiving surface 167, and a second upstanding wall 170 is disposed on the opposite side of the front ruler-receiving surface 167. Both of the first and second upstanding walls 168, 170 extend generally throughout the length of the gauge cover 148.

The ruler member 150 includes a proximal end 176 and a distal end 178. The distal end 178 is attached to the writing instrument support 151. The major portion of the ruler member 150 consists of a generally arcuate base member 180 having an upper, ruled surface 182. The arcuate base member 180 is generally H-shaped, and includes a first upstanding side member 184 disposed along its length on one side of the arcuate base member 180, and a second upstanding side member 186 disposed along the other side of the arcuate base member 180. Each of the first and second upstanding side members 184, 186 extends along generally the entire length of the ruler member 150.

Figure 14:
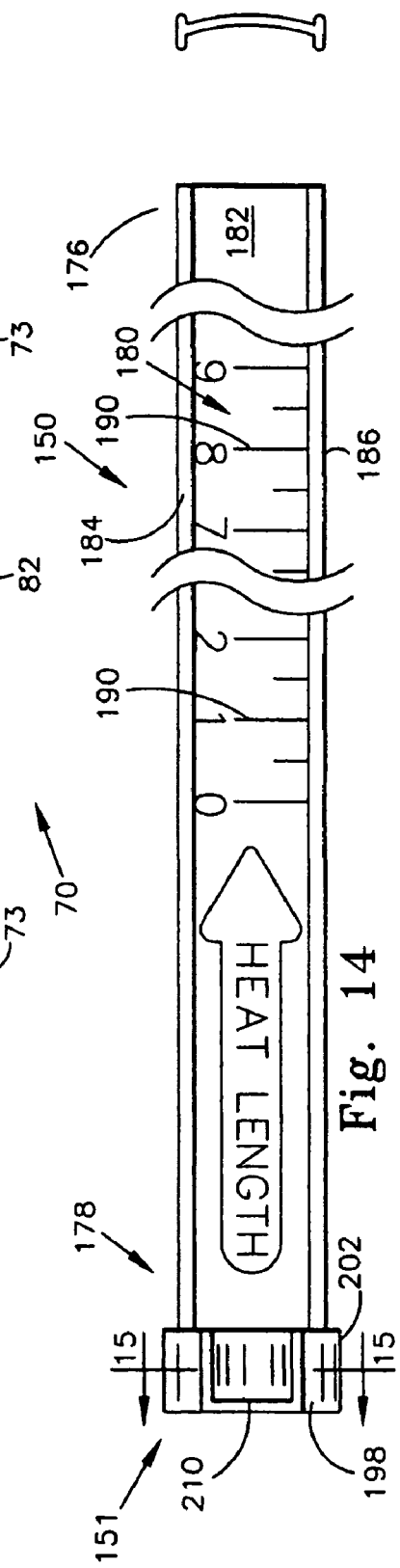
FIG. 14 is a top view of the slideable gauge member of the present invention.

As best shown in FIG. 14, the upper, ruled surface 182 includes a series of length indicia 190. The length indicia 190 can comprise a decal that includes a series of spaced markers resembling the unit-of-measure markings commonly found on a ruler. The length indicia 190 enables the user to place the appropriate length of a writing instrument casing 216 through the writing instrument receiving port 22 and into the sleeve 152 within the heating tube 100, so that an appropriate length of the writing instrument casing 216 will be softened to enable it to be bent around the perimetral surface 66 of the mold insert 34 to form a design of the desired size and shape.

The writing instrument support member 151 is generally pedestal shaped and includes a pedestal base portion 194 having a generally laterally extending cross member 198, a first ground-engaging leg 200 disposed on one side of the cross member 198, and a second ground-engaging leg 202 disposed on the other side of the cross member 198. The first and second legs 200, 202 extend below the cross member 198 for engaging a resting surface, such as a table or the ground, on which the heater unit 12 is placed. The first and second ground-engaging legs 200, 202 place the cross member 198 and hence the ruler 150 at an appropriate height above the resting surface, and also maintain the ruler member 150 in a generally horizontal, non-inclined plane.

The writing instrument support member 151 also includes an upstanding post 208 that extends upwardly from the cross member 198 and supports a supporting cup 210 at a predetermined distance above the cross member 198. The height of the post 208, and hence the height of the supporting cup 210, is governed by the height necessary to place the writing instrument casing 216 whose end is contained within the support cup 210 at the same level as the entrance port 22 to the heating element portion 20.

In operation, to decoratively mold the casing 216 of the writing instrument blank 11 having a distal end 222 and a proximal end 224 (FIG. 11), the ruler portion 150 is pulled axially outward in a direction indicated generally by arrow A of FIG. 2, to its furthest extent. The distal end 222 of the casing 216 to be decorated is then inserted into the receiving port 22 of the sleeve 152 and the proximal end 224 of the writing instrument casing 216 is placed upon the supporting cup 210 of the instrument support member 151.

With each different design, instructions will be included as to the appropriate heat length, which indicates to the user the extent to which he should insert the writing instrument casing 216 into the receiving port 22 which determines the length inserted in the sleeve 152 and the heater tube 100. The slideable ruler member 150 is then moved axially toward power converter portion 18 until the appropriate indicia (e.g., 8) lines up with the distal surface 125 of the distal end cap 124, signifying that an appropriate length of the writing instrument casing 216 is inserted into the sleeve 152.

The writing instrument casing 216 is kept within the sleeve 152 where it is heated by the heating tube 100, and more particularly, the conductive Ni Chrome ribbon 116 that is spirally wound around the external surface of the heating tube 100, until the casing 216 has reached an appropriate temperature. As the heating tube 100 is capable of operating at a constant temperature, the user can be instructed to allow the writing instrument casing 216 to remain within the sleeve 152 for a certain time period that has been predetermined to be the time necessary to enable the writing instrument casing 216 to reach the appropriate temperature. At the end of the time period, the ruler 150 can be moved axially distally again in a direction indicated by arrow A to permit the writing instrument casing 216 to be moved out of the writing instrument receiving port 22 and the sleeve 152 and placed on the interior mold insert 34 of the shaper unit 14.

Before delving into an explanation of the shaper member 14, it is first instructive to understand the writing instrument 13 that is produced by the shaper member 14. To make a shaped writing instrument 13, such as is shown in FIG. 12, the user starts with a generally linear writing instrument 11 such as the pen that is shown in FIG. 11. The writing instrument blank 11 includes the tubular outer member ("casing") 216 and a separable ink barrel 218 that is insertable into the tubular casing 216 to form a pen. When in the "blank" form as shown in FIG. 11, the casing 216 is generally linear throughout its length. The ink barrel 218 has a proximal end 221 and a distal end 223 and includes a tubular ink container 219 and an ink dispensing point 220. The ink dispensing point 220 is disposed at the proximal end 221 of the ink barrel 218. It will be noted that the ink barrel 218 has a length that is substantially shorter than the length of the blank casing 216. The shorter length is chosen so that the ink barrel 218 does not extend into the decoratively shaped head portion 15 of the finished shaped pen 13.

In FIG. 11, an ink barrel 218 is shown that is designed for insertion into the proximal end 224 of the tubular casing 216. The ink barrel 218 is not inserted into the casing 216 until after the decorative shape is formed in the head portion 15, as is shown in FIG. 12. The proximal end 223 of the ink barrel 218 does not extend all the way to the distal end 222 of the casing 216, but only extends to a position that is preferably within the linear portion of the casing 216 at the proximal end of the finished decorative pen 13 as shown in FIG. 12.

The shaper member 14 and its various components will now be described. The platform 30, best shown in FIGS. 1, 4, 5 and 17, includes a generally disk-shaped platform member 30, having an upper surface 232 and a lower surface 234. A perimetral, axially extending supporting skirt 238 extends circumferentially around the outer edge of the platform 30. Eight (8) foot supports 242 are formed on the underside surface, and are provided for serving as an attachment points for eight rubber feet 244. The rubber feet 244 are provided for engaging a resting surface, such as a table, upon which the platform 30 is resting, and to provide a frictional engagement between the resting surface and the platform 30 to resist lateral movement of the platform 30 along the resting surface.

Figure 17:
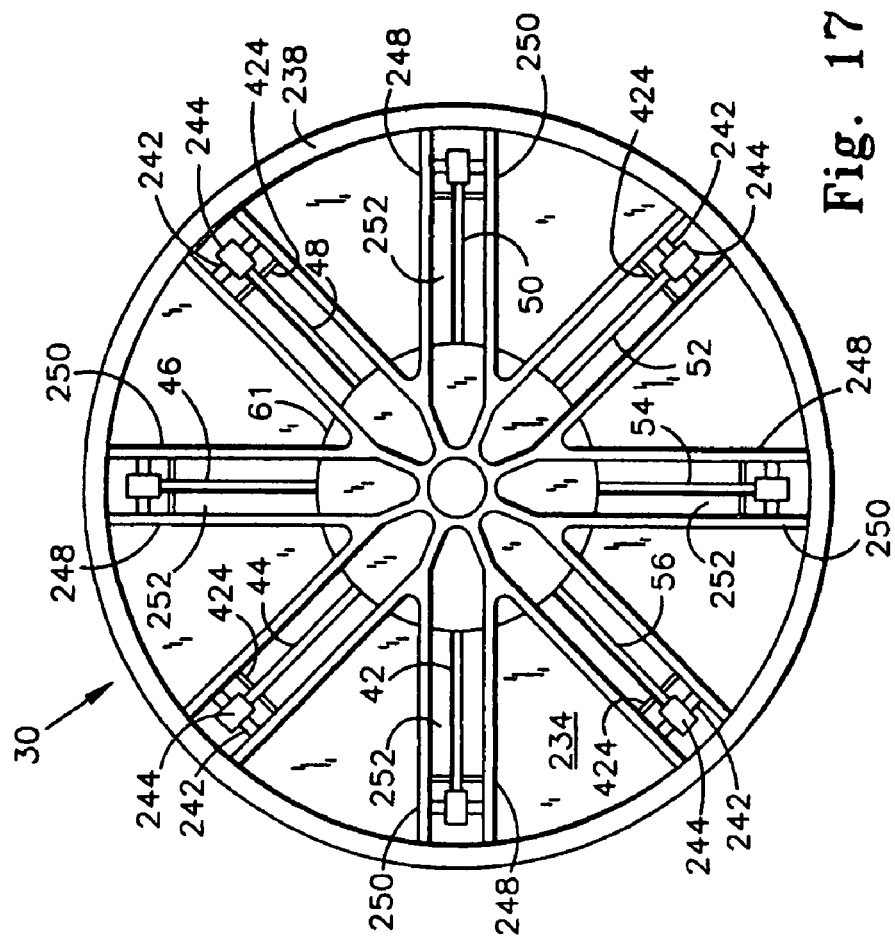
FIG. 17 is a bottom plan view of the platform member of the present invention.
Figure 16:
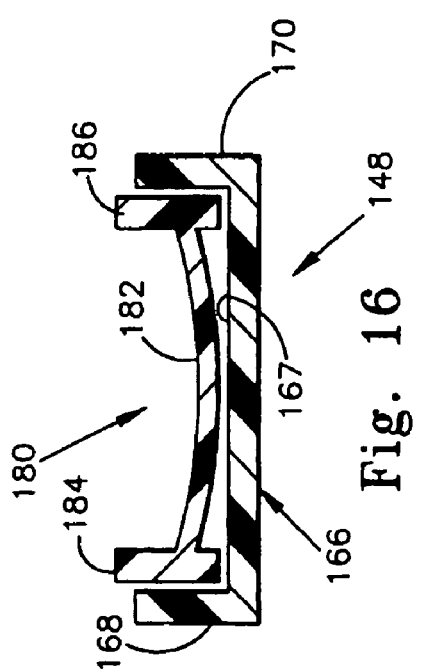
FIG. 16 is a sectional view of the gauge assembly of the present invention.

As best shown in FIG. 17, a series of eight radially extending channels 252 are formed on the underside surface 234 of the platform 30, with one channel being provided for each of the eight mold-engaging slots 42-56. Each channel 252 is defined by a first radially extending support 248 and a second radially extending support 250, which define there between the elongated cavity 252. Each of the mold-engaging slots 42-56 is generally centered circumferentially between a pair of the first and second radially extending supports 248, 250.

The supports 248, 250 and channel 252 serve a variety of functions. One function is to increase the structural rigidity of the platform 30. A second function performed is to increase the strength of the platform 30. During operation of the device, it is anticipated that weight-type stress will be placed upon the upper surface 232 of the platform 30, by the user "leaning into" the exterior mold assemblies 36, 38, 40 while making the decorative writing instrument. These radial supports 248, 250 help to permit the platform 30 to withstand these stresses, without breaking or sagging. Additionally, the supports 248, 250 are configured to serve as walls for the channels 252 to capture the slot-engaging portion of the exterior molds 36-40 and to help facilitate the radial movement of the molds 36-40 along the slots 42-56.

Figure 24:
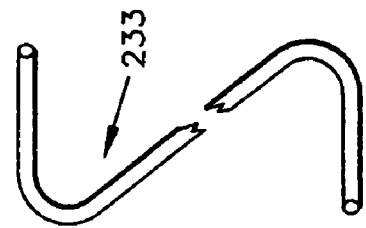
FIG. 24 is a top view of a flexible practice rod.
Figure 18:
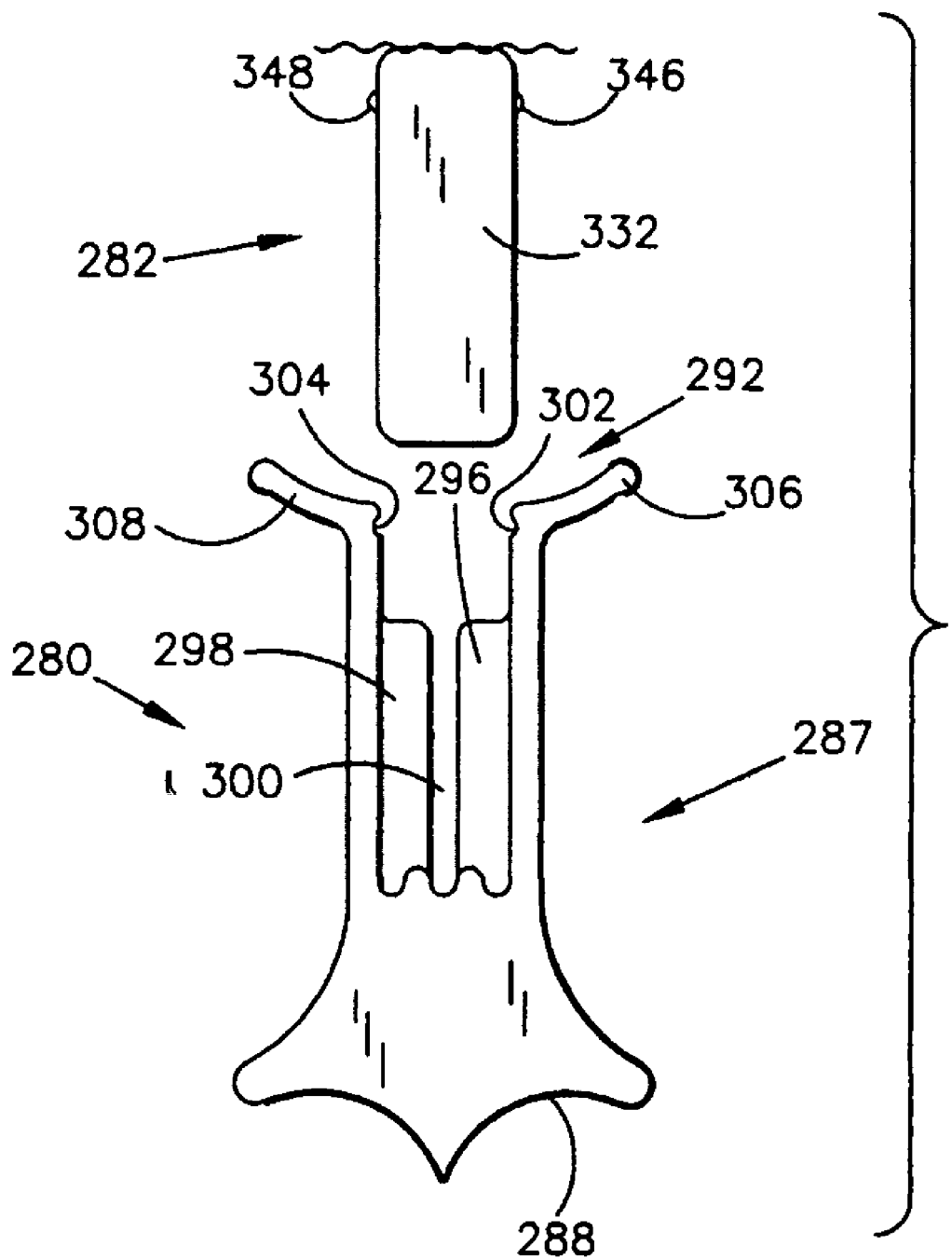
FIG. 18 is a top, exploded view of a mold insert and a portion of a mold base of the present invention.
Figure 19:
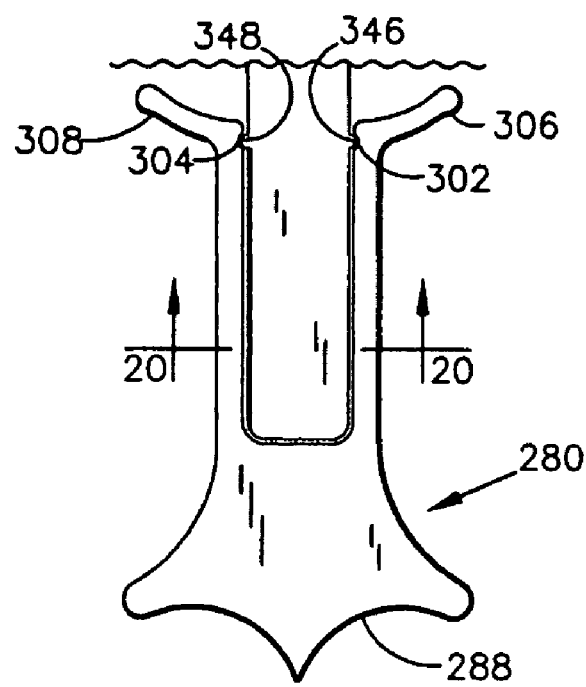
FIG. 19 is a top view, showing the mold insert joined to the mold base.
Figure 20:
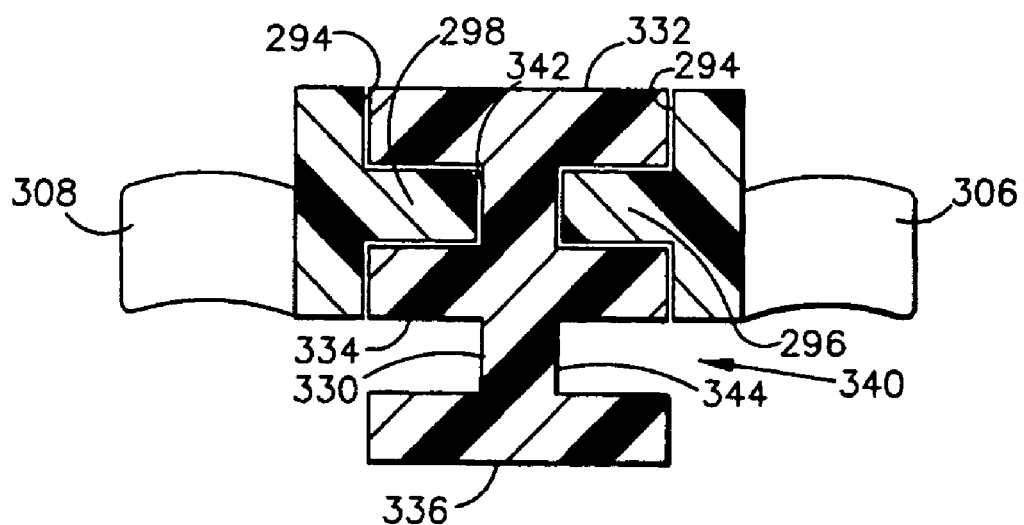
FIG. 20 is a sectional view taken along lines 20-20 of FIG. 19.
Figure 21:
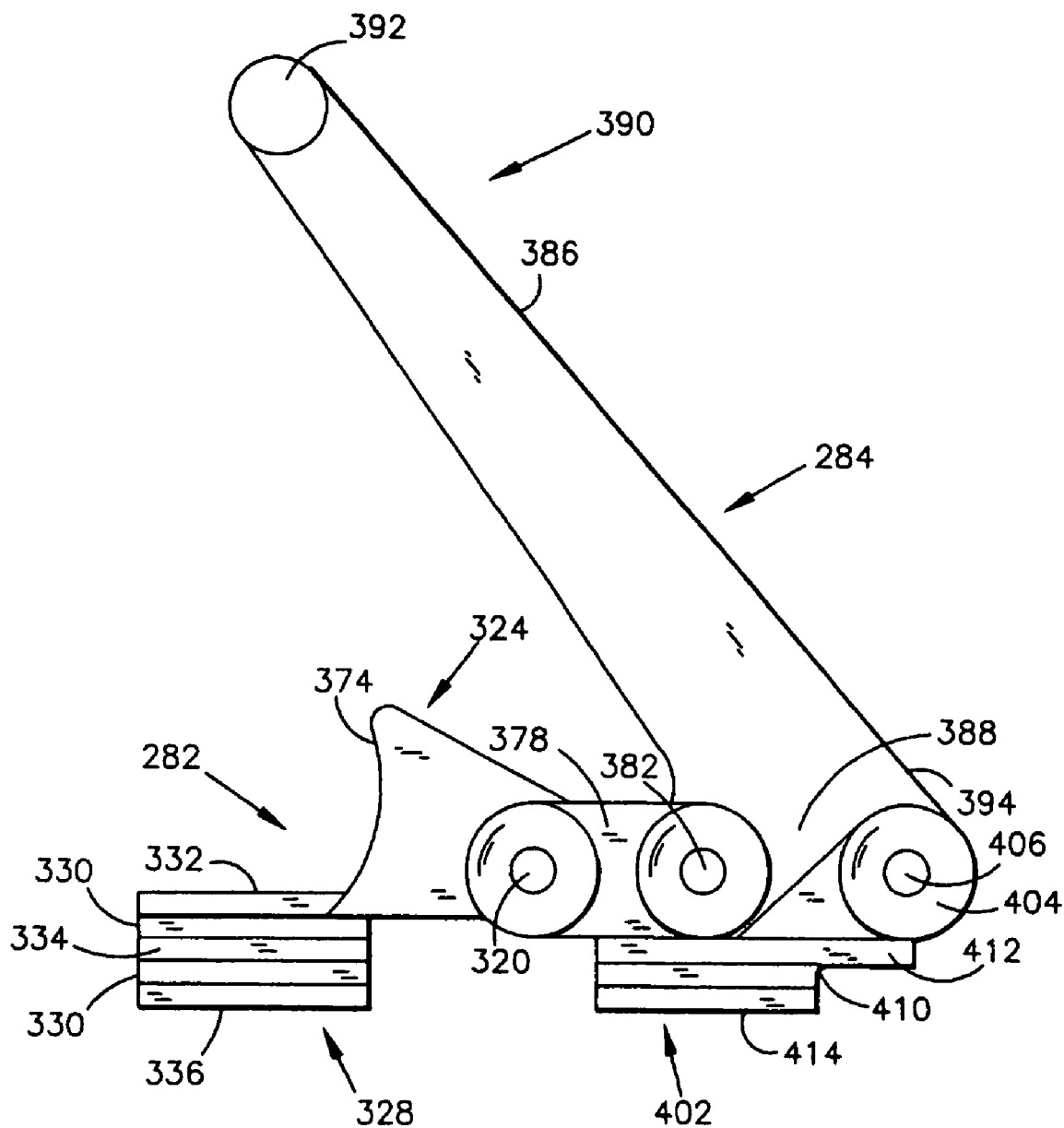
FIG. 21 is a sectional view of an exterior mold member of the present invention taken along lines 21-21 of FIG. 9.

Turning now to FIG. 24, a flexible practice rod 233 is shown. The practice rod 233 is preferably made from a flexible material such as rubber, and is formed to have a length, diameter and cross sectional shape that are generally similar to the writing utensil casing 216. The practice rod 233 is provided as a practice vehicle that the user may employ to help perfect his/her technique for wrapping the pen casing 216 around the interior mold 34, and otherwise perform the tasks necessary to form a writing instrument according to the present invention. By using the practice rod 233 the user can gain expertise without wasting pen casings 216, and without being required to employ heat to the practice rod 233.

The exterior mold assemblies 36, 38, 40 will now be described with reference to exterior mold assembly 36, it being understood that the primary difference between mold assemblies 36, 38, and 40 is that the mold engaging surfaces, discussed below, of the respective mold inserts 280, 281, and 283 are different, due to the fact that the various mold inserts 280, 281, 283 are designed to mold different portions to the finished writing instrument.

The exterior mold assembly 36 includes the mold insert 280; a mold holder portion 282, a pivot plate 378, a lever member portion 284 and a rear foot 402. The exterior mold assembly also includes a forward pivot member 320 coupling the mold holder portion 282 to the pivot plate 378, a middle pivot member 382 coupling the pivot plate 378 to the lever member portion 284, and a rear pivot member 406 coupling the lever member portion 284 to the rear foot 402.

The mold insert 280 is removably attachable to the mold assembly 36, and is interchangeable to produce different shaped finished writing instruments. The mold holder portion 282 is generally identical for each of the mold assemblies 36, 38, 40, and is designed for being attached to the appropriate mold insert, (e.g. 280, 281, 283).

Although they are formed initially from different components that are assembled together, the mold holder portion 282, the pivot plate 378, the lever member portion 284 and the rear foot member 402 are joined together after production with the pivot members 320, 382, 406, and are designed not to be taken apart after assembly, but rather, to remain as a functioning unit throughout the life of the product.

The mold insert 280 is best shown in FIGS. 6 and 18-20, as including a body 287 having a writing instrument casing engaging or shaping surface 288 disposed at the radially inward most extent of the body 287. As discussed above, the particular shape and configuration of the writing instrument shaping surface 288 will vary, depending upon both the shape being created, and the particular one of the two or more inserts being utilized in connection with any one particular design.

A coupling mechanism 292 is disposed at the generally radially outwardly disposed portion of the body 287, and includes an axially extending, radially interiorly facing U-shaped wall 294. Extending to the interior of the U-shaped wall 294 are a first radially extending engaging flange 296, and a second radially extending engaging flange 298. The first and second engaging flanges 296, 298 extend from opposite sides of the U-shaped wall 294 and define a slot 300 there between. The interior of the U-shaped wall 294 also includes a first detent receiving cut-out portion 302 and a second detent receiving cut-out portion 304, that are also placed on opposite sides of the U-shaped wall 294. As will be discussed in more detail below, the first and second detent receiving portions 302, 304 are sized and positioned for receiving first and second hemi-cylindrical protuberant detents 346, 348 that are formed on the mold holder portion 282.

A first generally outwardly extending gripping wing 306 and a second generally outwardly extending gripping wing 308 are formed at the radially outward end of the body 287 of the mold insert 280. The gripping wings 306, 308 provide a user engagable surface that helps the user to spread the outer portion of the body 287 apart to facilitate the user's engagement and disengagement of the mold insert 280 onto and off-of the mold holder 282.

The mold holder member 282 is best shown in FIGS. 6, 7 and 18-21 as including a main body portion 318 which is coupled to the forward pivot member 320, a forward foot member 328, and a finger-engagable detachment surface 324 formed near the rear of the forward foot member 328, near the attachment of the main body portion 318 with the forward pivot member 320.

The forward foot member 328 is a mold insert and slot-engagable moveable foot that includes vertically extending trunk portion 330 off of which extends a generally laterally extending first or upper flange 332, a laterally extending middle or second flange 334, and a laterally extending lower or third flange 336. The second and third flanges 334, 336 define a platform engaging slot 340 having a slot engaging surface 344 that is designed to receive the portion of the platform 30 adjacent to a radial slot (e.g. 42) of the platform 30. When the forward foot member 328 is inserted in one of the slots (e.g. 42) of the platform 30, the lower flange 336 is slideable along the lower surface 284 of the platform 30 in the radially extending slot 252 associated with the platform slot (e.g. 42) between the first and second radially extending supports 248, 250; and the middle flange 334 slides therewith along the upper surface 232 of the platform 30 so that the slot engaging portion 344 of trunk 330 extends through the platform slot (e.g. 42) of the platform 30.

Similarly, the first and second flanges 332, 334 define an insert-engaging portion 342 of the trunk 330 that extends through the slot 300 on the interior of the U-shaped wall 294 of the mold insert 280. The forward foot member 328 also includes the first and second detent members 346, 348 that are sized and positioned for engaging the detent receiving slots 302, 304 of the mold insert 280, to fixedly couple the mold insert 280 to the forward foot member 328 of the mold holder member 282.

As discussed above, the forward foot member 328 is freely movable within the slot (e.g. 42), so that it can carry the mold insert 280 into and out of engagement with the writing instrument casing 216 that is wrapped around the interior mold insert 34. The manner in which the mold body member 282 can be moved radially, inwardly and outwardly is best understood with respect to the operation of the other portions of the device.

The main body portion 318 of the mold holder portion 282 is connected to the rear portion of the forward foot member 328. The main body portion 318 includes a generally vertically disposed first plate 356 and a generally vertically disposed second plate 358 (FIGS. 6, 7 and 9). The first and second plates 356, 358 have interior faces 357, 359, respectively, that define a slot there between. The forward pivot member 320 runs between the first and second plates 356, 358 of the main body portion 318.

Figure 22:
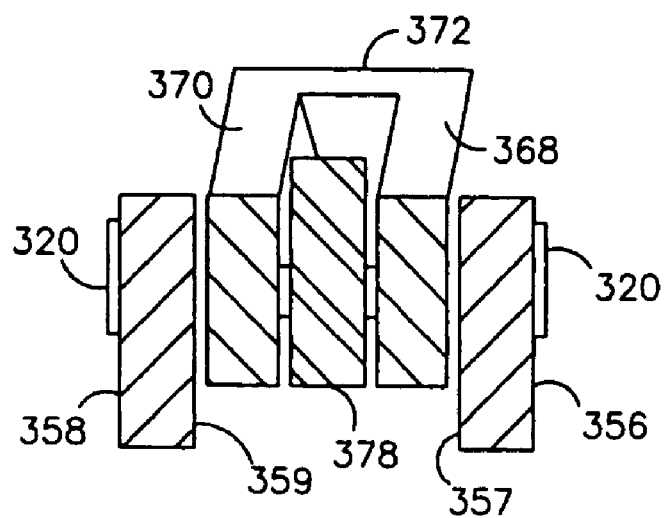
FIG. 22 is a sectional view of an exterior mold member of the present invention taken along lines 22-22 of FIG. 6.

As best shown in FIGS. 9 and 22, the finger-engagable detachment member 324 is generally U-shaped in cross section, and includes a first axially extending leg 368, a second axially extending leg 370, and a radially extending cross member 372 having an arcuate, axially and distally facing finger engaging surface 374. The first and second axially extending legs 368, 370 are fixedly coupled to the first and second vertically disposed plates 356, 358 of the main body portion 318, and are not moveable with respect thereto. The finger engagable, detachable member 324 can be unitarily molded with the plates 356, 358, or alternately, can be formed separately and then joined thereto by gluing, sonic welding, chemical adhesives, or some other fastening or coupling mechanism.

The flat-sided ovaloid pivot plate 378 extends between the front pivot member 320 and the middle pivot member 382. The pivot plate 378 is generally vertically extending, and includes front and rear apertures for receiving the front and middle pivot members 320, 382. As best shown in FIG. 22, the forward pivot member 320 extends through apertures in the first plate 356, the first leg 368, the pivot plate 378, the second leg 370 and the second plate 358 coupling the mold holder portion 282 and the finger-engagable detachment member 324 to the pivot plate 378.

A vertically extending lever arm 386 is provided for moving the front slot engaging foot 328 and the rear slot engaging foot 402 with respect to each other, between a mold disengaged position, such as is shown in FIG. 8, where the front foot 328 and the rear foot 402 are positioned adjacent to each other, and a mold insert engaged position, such as is shown in FIG. 7, where the front foot 328 is spatially axially separated from the rear foot 402. In one embodiment, the front foot 328 and the rear foot 402 are spatially separated by approximately 1 inch. The lever arm 386 includes a horizontally extending base portion 388 and a generally vertically upwardly extending handle portion 390. The handle portion 390 is generally H-shaped in cross-section (FIG. 23) and includes an upper end 392, and a lower end 394 that is disposed adjacent to the base portion 388.

Figure 23:
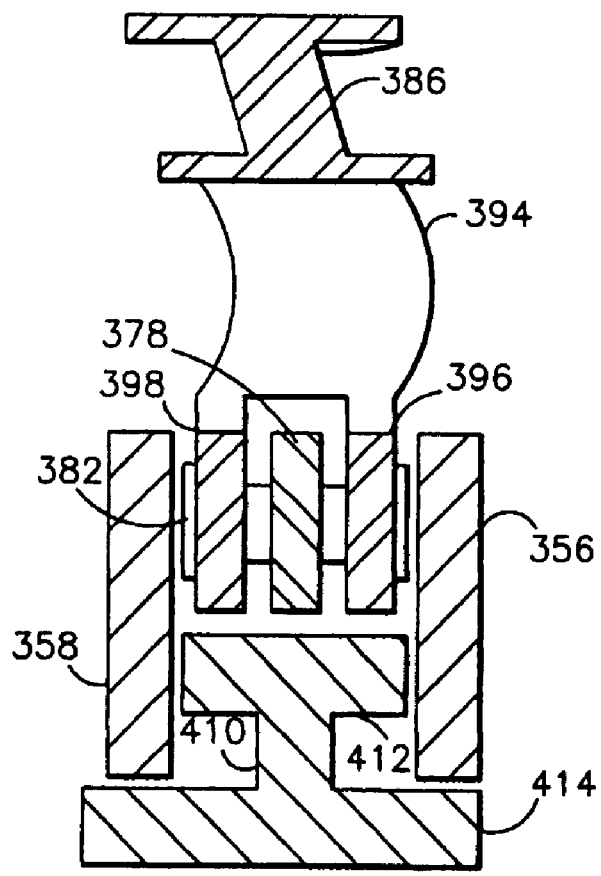
FIG. 23 is a sectional view of an exterior mold member of the present invention taken along lines 23-23 of FIG. 6.

The base portion 388 of the lever arm 386 includes a first vertical plate 396 and a second vertical plate 398 that are disposed in generally parallel planes. The first and second vertical plates 396, 398 define a slot there between running the length of the base portion 388. The pivot plate 378 extends into the front portion of the slot between the first and second vertical plates 396, 398. As best shown in FIG. 23, the middle pivot member 382 extends through apertures in the first vertical plate 396, the pivot plate 378 and the second vertical plate 398 coupling the pivot plate 378 to the base portion 388 of the lever arm 386.

The rear foot member 402 includes a pivot flange 404 and a slot engaging portion 408. The pivot flange 404 is disposed in a generally vertical plane and extends into the rear portion of the slot between the first and second vertical plates 396, 398 of the base portion 388 of the lever arm 386. The rear pivot member 406 extends through apertures in the first vertical plate 396, the pivot flange 404 and the second vertical plate 398 coupling the rear foot member 402 to the base portion 388 of the lever arm 386.

The slot engaging portion 408 of foot member 402 is provided for slideably being received within one of the radially extending slots 42-56 of the platform 30. To facilitate reception in one of the platform slots, e.g. platform slot 42, the slot engaging portion 408 of the foot member 402 includes a trunk 410 that is received within the slot 42, an upper cross-member 412 having a lower surface that rides on the top surface 232 of the platform 30 adjacent to the slot 42, and a lower cross member 414 that has an upper surface that rides adjacent to the underside surface 234 of the platform 30 adjacent to slot 42.

The rearward portion of the lower cross-member 412 on each side of the trunk 410 also includes a female detent receiving recess 422 for receiving a protuberant male detent member 424 that is formed on the underside surface 234 of the platform 30 in each of the channels 252 adjacent to the foot member 244 on each side of the radially extending slot 42-56. The finger engaging surface 374 can be used to apply force to engage the male 424 and female 422 detent members. The engagement of the male 424 and female 422 detent members locks the rear foot 402 of the exterior mold assembly 36 in the channel 252 associated with one of the platform slots 42-56 while still allowing the front foot assembly 328 to slide axially in the remainder of the channel 252 of the one of the platform slots 42-56. Thus, the rear pivot member 406 is fixed axially at the outer portion of the platform slot 42-56 and the movement of the lever arm 386 moves the front foot member 328 on the underside 234 of the platform 30 and the mold holder portion 282 and mold insert 280 on the upper surface 232 of the platform 30 inwardly and outwardly in the platform slot 42-56.

The present invention is operated as follows to manufacture a decorative writing instrument.

The first step in the process is to assemble the shaper 14. To do this the user must first place the exterior mold assemblies 36, 38, 40 into the proper slots 42-56 of the platform 30. Within a kit for a heart shaped decorative shape, as shown in the figures, there will be three exterior mold assemblies 36, 38, 40, along with instructions as to the appropriate slot 42-56 in which to place each exterior mold assembly 36, 38, 40 and the proper mold insert 280, 281, 283 to place on each exterior mold assembly 36, 38, 40. It will be appreciated that more or less exterior mold assemblies and associated mold inserts will be necessary depending on the decorative shape to be formed Preferably, the well 61 has indicia uniquely identifying each of the slots 42-56 of the platform 30 and the mold inserts 281, 282, 283 also include indicia relating to the appropriate slot 42-56 into which to insert the various exterior mold assemblies 36, 38, 40. For example, the well could have one of the letters A-H in front of each one of the slots 42-56 and one of the mold inserts, e.g., 281, could indicate slot D. The user would then know to put one of the exterior mold assemblies 36, 38, 40, e.g., 38, into the slot 42-56 that is identified as slot D and later attach mold insert 281 to the exterior mold assembly 38 inserted in slot D. Through this procedure, the user would correctly insert the exterior mold assemblies 36, 38, 40 into the platform slots 42-58 for later attachment of the mold inserts 281, 282, 283 for the particular design being made.

Once the proper slot 42-56, e.g., slot 42, is chosen for exterior mold assembly 36, the next step is to insert the rear foot 402 and then the front foot 328 of the exterior mold assembly 36 into the slot 42 by placing the feet 402, 328 within well 61, adjacent to the slot 42, and then moving the feet 402, 328 radially outward in the slot 42 until such point as the female detent receiver 422 on the rear foot 402 engages the male, protuberant detent member 424 that is formed on the underside surface of the platform 30 in the channel 252 associated with slot 42. This will cause the rear foot 402 of the exterior mold assembly 36 to be locked in its radially outward-most position within the slot 42.

Preferably, the exterior mold assembly 36 is inserted into the appropriate slot 42 without the mold insert 280 being attached to the mold holder portion 282. Because of the radially inward extent of the mold insert 280, the mold insert 280 is joined to the mold holder 282 only after the interior mold member 34 is inserted into the receiving well 61 to prevent the mold insert 280 from interfering with placement of the interior mold insert 34 in the well 61.

Similar procedures are followed for engaging the other two exterior mold assemblies 38, 40 into their respective appropriate platform slots 44-56.

The next step is to insert the appropriate interior mold member 34 into the mold well 61. Due to the non-symmetrical perimetral surface 62 of the mold base 60 and the mold well 61, there should only be one way in which the interior mold member 34 fits into the mold well 61 so that the upper surface of the interior mold base 34 is co-planar with the upper surface 232 of the platform 30.

Then the mold inserts 281, 282, 283 are inserted into the appropriate exterior mold inserts 36, 38, 40. At this point, the shaper portion 14 of the present invention is assembled and ready for use. The procedure for heating the writing instrument casing 216 to its appropriate temperature was described above and shall not be repeated here.

When the casing 216 has reached the desired temperature, the distal end 222 of the casing 216 is then wrapped around the exterior surface 66 of the raised interior mold 64 of the interior mold insert 34. When that is done, the user moves the lever arm 386 in a direction indicated generally by arc B (FIG. 8). This movement of the lever arm 386 moves the hinge and pivot mechanisms described above, in connection with the various pivot pins 320, 382, 406, to move the forward foot 328 radially inward in the platform slot so that the exterior mold assembly moves essentially from the position shown in FIG. 8, its retracted position, to the position shown in FIGS. 6 and 7, its extended position, wherein the mold insert 280 is moved radially inward through the inward movement of the front foot 328 so that the mold engaging surface 288 of the insert 280 engages the casing 216 of the writing instrument to "squeeze" the writing instrument casing 216 against the perimetral surface 66 of the interior mold 34. This "squeezing" of the casing 216 causes the writing instrument casing 216 to take a shape that conforms to the space formed between the opposed surfaces 288 of the mold insert 280 and 66 of the interior mold 34, to thereby form the head portion 15 of the writing instrument casing 216 into its desired shape.

Similarly, the second and third exterior mold assemblies 38, 40 are manipulated similarly, to form other portions of the head portion 15 of the casing 216 into their appropriate shape.

The device is then left on the mold for a period of time, so that the thermo-formable plastic of the casing 216 has an adequate time to cool down and sufficiently harden to set in the desired shape. Then the casing 216 can be removed from the shaper unit 14 while maintaining the shape that it was given in the molding process.

Once the writing instrument casing 216 is removed, the ink barrel 218 can be inserted into the proximal end 224 of the casing 216, to form the finished writing instrument 13 as shown in FIG. 12.

Although the invention has been described in detail with reference to certain preferred embodiments, it will be appreciated by those skilled in the art that variations and modifications can exist within the scope and spirit of the invention as so described.

I claim:

1. A hobbyist-useable apparatus for fabricating decoratively shaped writing instruments having a plastic casing, said apparatus comprising:
    a heater unit comprising
        a heat source, and
        a heating compartment having an opening for inserting and removing the casing,
        said heat source providing heat to said heating compartment; and
    a shaper unit comprising
    a platform having an elongated slot,
    an exterior mold assembly attachable to said platform and manually moveable by a user in said elongated slot;
    an exterior shaping surface coupled to said exterior mold assembly; and
    an interior mold insert having an interior shaping surface, said interior mold insert being attachable to said platform such that the movement of said exterior mold assembly in said elongated slot moves said exterior shaping surface towards and away from said interior shaping surface;
wherein the casing is heated in said heating compartment, then the heated casing is placed on said platform and is compressed between said interior shaping surface and said exterior shaping surface by movement of said exterior mold assembly in said elongated slot, then the casing is allowed to cool.

2. The apparatus of claim 1, wherein said exterior shaping surface is removably attachable to said exterior mold assembly.

3. The apparatus of claim 1, further comprising a plurality of exterior mold assemblies and a plurality of exterior shaping surfaces, each of said plurality of exterior shaping surfaces being removably attachable to any one of said plurality of exterior mold assemblies, and wherein said platform has a plurality of elongated slots, each of said plurality of exterior mold assemblies being attachable to any one of said plurality of elongated slots enabling said apparatus to create different decorative shapes.

4. The apparatus of claim 1, wherein said heating compartment further comprises a unitary heating tube having a proximal end and a distal end, said heating tube having an opening at said distal end which provides said opening for inserting and removing the casing.

5. The apparatus of claim 4, wherein said heat source further comprises a heating element wrapped around said heating tube.

6. The apparatus of claim 5, wherein said heat source further comprises an interior insulating tape and an exterior insulating tape, said interior insulating tape being wrapped around the length of said heating tube, said heating element being wrapped around the length of said interior insulating tape, and said exterior insulating tape being wrapped around said heating element.

7. The apparatus of claim 4, wherein said heating compartment further comprises a tubular sleeve, said tubular sleeve being inserted in the interior of said heating tube and extending through said distal opening of said heating tube, wherein, when the casing is inserted in said heating tube, said tubular sleeve is between said casing and the surface of said heating tube.

8. The apparatus of claim 1, further comprising a gauge assembly for measuring the length of the casing inserted in said heating compartment.

9. The apparatus of claim 8, wherein said gauge assembly further comprises a gauge cover and a ruler member, said gauge cover being attached to said heating compartment and said ruler member being slide-able in said gauge cover to measure the length of the casing inserted in said heating compartment.

10. The apparatus of claim 1, wherein said platform further comprises a mold receiving well having side walls, and said interior mold insert further comprises a base having a perimetral surface, said interior shaping surface being attached to said base, wherein said perimetral surface of said base is sized and shaped to fit in said mold receiving well to stabilize said interior shaping surface.

11. The apparatus of claim 10, wherein said perimetral surface of said base has an irregular shape and said side walls of said mold receiving well has a matching irregular shape, wherein said base only fits in said mold receiving well in one position thereby ensuring that said interior shaping surface is properly oriented in said mold receiving well of said platform.

12. A hobbyist-useable apparatus for fabricating decoratively shaped writing instruments having a casing, said apparatus comprising:
    a platform having an elongated slot,
    an interior mold insert having an interior shaping surface, said interior mold insert being attachable to said platform
    an exterior mold assembly attachable to said platform and manually moveable by a user in said elongated slot;
    an exterior shaping surface coupled to said exterior mold assembly; the exterior mold assembly including a lever arm portion having a lever arm, said lever arm being manually moveable between a raised position wherein said exterior shaping surface is moved away from said interior shaping surface, and a lowered position wherein said exterior shaping surface is moved towards said interior shaping surface.

13. The apparatus of claim 12, wherein said exterior mold assembly further comprises a locking portion and a moveable portion, said locking portion including an assembly lock mechanism, wherein said assembly lock mechanism locks said locking portion in place on said platform, said lever arm portion connects said locking portion to said moveable portion, and said exterior shaping surface is coupled to said moveable portion.

14. The apparatus of claim 13, wherein said exterior mold assembly further comprises a rear foot member and a rear pivot member, said rear pivot member coupling said rear foot assembly to said lever arm portion, and said rear foot assembly and said rear pivot member being part of said locking portion of said exterior mold assembly.

15. An apparatus for fabricating decoratively shaped writing instruments having a casing, said apparatus comprising:
- a heater unit comprising
  - a heat source, and
  - a heating compartment having an opening for inserting and removing the casing, said heat source providing heat to said heating compartment; and
- a shaper unit comprising
  - a platform having an elongated slot,
  - an exterior mold assembly attachable to said platform and moveable in said elongated slot;
  - an exterior shaping surface coupled to said exterior mold assembly; and
  - an interior mold insert having an interior shaping surface, said interior mold insert being attachable to said platform such that the movement of said exterior mold assembly in said elongated slot moves said exterior shaping surface towards and away from said interior shaping surface;
  - the exterior mold assembly including
    - a lever arm portion having a lever arm, said lever arm being moveable between a raised position wherein said exterior shaping surface is moved away from said interior shaping surface, and a lowered position wherein said exterior shaping surface is moved towards said interior shaping surface,
    - a locking portion and
    - a moveable portion, said locking portion including an assembly lock mechanism, wherein said assembly lock mechanism locks said locking portion in place on said platform, said lever arm portion connects said locking portion to said moveable portion, and said exterior shaping surface is coupled to said moveable portion
    - a rear foot member and
    - a rear pivot member, said rear pivot member coupling said rear foot assembly to said lever arm portion, and said rear foot assembly and said rear pivot member being part of said locking portion of said exterior mold assembly, the rear foot member further including a vertically extending rear trunk member, a laterally extending rear lower flange extending from said rear trunk member near the bottom of said rear trunk member, a laterally extending upper flange extending from said rear trunk member above said rear lower flange, said laterally extending rear upper and lower flanges defining a rear platform engaging slot, wherein said rear platform engaging slot couples said rear foot member to said platform,
  - wherein the casing is heated in said heating compartment, then the heated casing is placed on said platform and is compressed between said interior shaping surface and said exterior shaping surface by movement of said exterior mold assembly in said elongated slot, then the casing is allowed to cool.

16. The apparatus of claim 14, wherein said exterior mold assembly further comprises a mold holder portion having a main body portion and a front foot member, said front foot member being coupled to said exterior shaping surface, said mold holder portion being part of said moveable portion of said exterior mold assembly.

17. The apparatus of claim 16, wherein said exterior mold assembly further comprises a pivot plate, a front pivot member and a middle pivot member, said middle pivot member connecting said lever arm portion to said pivot plate, and said front pivot member connecting said main body of said mold holder member to said pivot plate.

18. The apparatus of claim 17, wherein said front foot member further comprises a vertically extending front trunk member, a laterally extending front lower flange extending from said front trunk member near the bottom of said front trunk member, a laterally extending front middle flange extending from said front trunk member above said front lower flange, and a laterally extending front upper flange extending from said front trunk member above said front middle flange, said laterally extending front upper and middle flanges defining an insert engaging slot, and said laterally extending front middle and lower flanges defining a front platform engaging slot, wherein said insert engaging slot couples said exterior shaping surface to said exterior mold assembly and said front platform engaging slot couples said front foot member to said platform.

19. The apparatus of claim 16, wherein said exterior mold assembly further comprises a finger engaging member having a finger engaging surface, said finger engaging member being coupled to said main body of said mold holder portion, wherein pushing said finger engaging surface exerts pressure on said lock mechanism of said exterior mold assembly to lock said exterior mold assembly in place on said platform.

20. An apparatus for fabricating decoratively shaped writing instruments having a casing, said apparatus comprising:
- a heater unit comprising
  - a heating tube having a distal opening;
  - a heat source providing heat to said heating tube;
  - a tubular sleeve having a distal opening inserted in the interior of said heating tube and extending through said distal opening of said heating tube,
  - a cover surrounding said heating tube to protect against touching of said heating tube and heat source,
  - a distal end cap having a cover opening attached to said cover, the distal opening of said tubular sleeve being coupled to said cover opening such that a writing instrument casing can be inserted and removed from said heating tube through said cover opening;
- a gauge assembly comprising,
  - a gauge cover attached to said cover of said heater unit, and
  - a ruler member slideable in said gauge cover to measure the length of the casing inserted in said heater unit; and
- a shaper unit comprising
- a platform having a plurality of elongated slots and a mold receiving well having side walls,
- an interior mold insert having a interior shaping surface, said interior mold removably insertable in said mold receiving well of said platform;
- a plurality of exterior mold assemblies, each of said plurality of exterior mold assemblies being attachable to any one of said plurality of elongated slots of said platform, each of said plurality of exterior mold assemblies comprising a rear foot member lockable to said platform, a lever arm, a rear pivot member connecting said lever arm to said rear foot member, a pivot plate, a middle pivot member connecting said lever arm member to said pivot plate, a front foot member, a front pivot member connecting said front foot member to said pivot plate and an exterior shaping surface coupled to said front foot member, said front foot member being moveable in said one of said plurality of elongated slots to which said exterior mold assembly is attached, wherein said lever arm is moveable between a raised position wherein said front foot member and said coupled exterior shaping surface is moved away from said interior shaping surface, and a lowered position wherein said foot member and said coupled exterior shaping surface is moved towards said interior shaping surface;

wherein the writing utensil casing is heated in said heater unit, then the heated casing is placed on said platform and is compressed between said interior shaping surface and said exterior shaping surface by movement of said plurality of exterior mold assemblies in said plurality of said elongated slots.

21. A hobbyist-useable apparatus for fabricating decoratively shaped writing instruments having a casing, said apparatus comprising:

a platform having a first and second elongated slot, an interior mold insert attachable to and fixedly positionable relative to the platform, the mold insert having an interior shaping surface, a first and a second exterior mold assembly attachable to said platform and manually moveable by a user in the respective first and second elongated slots, a first and second exterior shaping surface coupled to the respective first and second said exterior mold assemblies, wherein the first and second exterior mold assemblies are manually movable relative to the interior mold insert to enable the first and second exterior shaping surfaces to engage a casing placed between the interior shaping surface and the first and second exterior shaping surfaces.

22. The apparatus of claim 21, wherein the platform includes a center portion and a periphery portion, further comprising a third and fourth elongated slot, wherein the first, second, third, and fourth elongated slots are disposed radially about the center portion of the platform, with each extending in a direction generally between the center portion and the periphery portion of the platform.

* * * * *